(12) United States Patent
Ritucci et al.

(10) Patent No.: US 10,974,751 B2
(45) Date of Patent: Apr. 13, 2021

(54) FOLDING CART

(71) Applicant: OUT OF THE BOX CONCEPTS, LLC, Woodbridge, CT (US)

(72) Inventors: Louis N. Ritucci, Woodbridge, CT (US); Kevin Outz, Denver, NC (US); Yiu Cho Fok, Mountain View, CA (US)

(73) Assignee: OUT OF THE BOX CONCEPTS, LLC, Woodbridge, CT (US)

( * ) Notice: Subject to any disclaimer, the term of this patent is extended or adjusted under 35 U.S.C. 154(b) by 362 days.

(21) Appl. No.: 16/096,419

(22) PCT Filed: Apr. 27, 2017

(86) PCT No.: PCT/US2017/029869
§ 371 (c)(1),
(2) Date: Oct. 25, 2018

(87) PCT Pub. No.: WO2017/189861
PCT Pub. Date: Nov. 2, 2017

(65) Prior Publication Data
US 2020/0324799 A1 Oct. 15, 2020

Related U.S. Application Data

(60) Provisional application No. 62/329,408, filed on Apr. 29, 2016.

(51) Int. Cl.
*B62B 3/02* (2006.01)
*B62B 5/06* (2006.01)
*B62B 3/00* (2006.01)

(52) U.S. Cl.
CPC ............. *B62B 3/022* (2013.01); *B62B 5/065* (2013.01); *B62B 5/067* (2013.01); *B62B 3/001* (2013.01);
(Continued)

(58) Field of Classification Search
CPC ......... B62B 3/001; B62B 3/022; B62B 5/065; B62B 5/067; B62B 2205/04; B62B 2205/12; B62B 2205/30
See application file for complete search history.

(56) References Cited

U.S. PATENT DOCUMENTS

| 4,637,626 A | 1/1987 | Foss et al. |
| 5,752,290 A * | 5/1998 | Tsai ...................... A45C 5/146 16/34 |

(Continued)

FOREIGN PATENT DOCUMENTS

CN 10340769 11/2013

*Primary Examiner* — Bryan A Evans
(74) *Attorney, Agent, or Firm* — Ware, Fressola, Maguire & Barber LLP

(57) ABSTRACT

A pulling cart with four wheels can be folded into a folded configuration. The wheels are mounted on wheel assemblies which can be in an open or a folded position. The cart has a front panel hinged to a rear panel. The front panel has a front carrier for mounting two wheel assemblies and a pair of slide rails extendable to the second panel. A rear carrier having two wheel assemblies is fixedly mounted to the end portion of the slide rails to move between the front and rear panels. When the cart is used for pulling, all wheel assemblies are in the open position. Each carrier has two arm-receiving holes. Each wheel assembly has a pair of arcuate arms which can rest on the carrier to support the wheel in the open position or move through the arm-receiving hole into the folded position for folding the cart.

16 Claims, 22 Drawing Sheets

(52) U.S. Cl.
CPC ....... *B62B 2205/04* (2013.01); *B62B 2205/12* (2013.01); *B62B 2205/30* (2013.01)

(56) References Cited

U.S. PATENT DOCUMENTS

| | | | |
|---|---|---|---|
| 6,845,991 B1 | 1/2005 | Ritucci et al. | |
| 2003/0085552 A1* | 5/2003 | Shapiro | B62B 3/16 280/646 |
| 2006/0163828 A1* | 7/2006 | Renz | B62B 3/02 280/79.11 |
| 2015/0014965 A1* | 1/2015 | Gibson | B62B 1/002 280/651 |
| 2016/0052534 A1* | 2/2016 | Henao | B62B 1/002 280/651 |

* cited by examiner

FOLDING CART

CROSS REFERENCE TO RELATED PATENT APPLICATION

This application claims priority under 35 USC 119 to U.S. Provisional Patent Application No. 62/329,408, filed Apr. 29, 2016, whose entire contents are hereby incorporated by reference.

FIELD OF THE INVENTION

The invention relates to wagons or carts and, more particularly, to foldable wagons or carts.

BACKGROUND OF THE INVENTION

Small wagons or carts have been popular and widely used by individuals of all ages. Small wagons or carts can be used to transport a variety of objects with ease and convenience. One disadvantage of these wagons or carts is that they cannot easily be stored in a small, compact space. For example, a wagon or cart may not be able to fit in the trunk of a car. Even if it can be put in the car, it would take up too much space.

Thus, it is desirable to have a small wagon or cart that is foldable. In other words, it would be advantageous to have a wagon or cart that can be deployed in an open configuration and a folded configuration. The wagon or cart has a handle. When the cart is deployed in the open configuration, the handle is used to pull the cart. When the cart is deployed in the folded configuration, part of the handle can be used for carrying the cart.

SUMMARY OF THE INVENTION

The present invention provides a cart with four wheels. The wheels are mounted on separate wheel assemblies which is operable in an open position or in a folded position. The cart can be operated in an open configuration so it can be used as a pulling cart. The cart can be folded into a folded configuration. The cart has a front panel hinged to a rear panel. The front panel has a front carrier for mounting two wheel assemblies and a pair of slide rails extendable to the second panel. A rear carrier having two wheel assemblies is fixedly mounted to the end portion of the slide rails to move between the front and rear panels. When the cart is used for pulling, for example, all wheel assemblies are in the open position. Each carrier has two arm-receiving holes. Each wheel assembly has a pair of arcuate arms which can rest on the carrier to support the wheel in the open position or move through the arm-receiving hole into the folded position for folding the cart.

Thus, it is an aspect of the present invention to provide a cart constructed for deployment between a folded configuration and an open configuration, the cart comprising:

a front side and an opposing rear side;

a front panel and a rear panel hinged to the front panel for facilitating the deployment between the folded configuration and the open configuration;

a pair of slide rails, each having a front rail section fixedly attached to the front panel and a rear rail section extendable to the rear panel;

a front carrier rotatably mounted on the front panel, the front carrier having two front arm-receiving openings made thereon, each front arm-receiving opening having a width;

a handle pivotably mounted on the front carrier near the front side of the cart;

a rear carrier fixedly attached to the rear rail section, the rear carrier having two rear arm-receiving openings made thereon, each rear arm-receiving opening having a width;

a pair of front wheel assemblies pivotably mounted on the front carrier, each front wheel assembly operable in a folded position and an open position, wherein each front wheel assembly comprises a wheel fork dimensioned for mounting a wheel and a pair of arcuate arms, the arcuate arms having a first portion fixedly amounted on the wheel fork, and a second portion having two arm-end parts separated by a distance greater than the width of the front arm-receiving opening, wherein when the front wheel assembly is operated in the open position, the two arm-end parts of the arcuate arms are arranged to rest on the front carrier on opposing sides of the front arm-receiving opening, and wherein the arcuate arms can be squeezed toward each other to reduce the distance for allowing the arcuate arms to move through the front arm-receiving opening so as to change the front wheel assembly from the open position to the folded position; and a pair of rear wheel assemblies pivotably mounted on the rear carrier, each rear wheel assembly operable in a folded position and an open position, wherein each rear wheel assembly comprises a wheel fork for mounting a wheel and a pair of arcuate arms, the arcuate arms having a first portion fixedly mounted on the wheel fork, and a second portion having two arm-end parts separated by an end distance greater than the width of the rear arm-receiving opening, wherein when the rear wheel assembly is operated in the open position, the two arm-end parts of the arcuate arms are arranged to rest on the rear carrier on opposing sides of the rear arm-receiving opening, and wherein the arcuate arms can be squeezed toward each other to reduce the end distance for allowing the arcuate arms to move through the rear arm-receiving opening so as to change the rear wheel assembly from the open position to the folded position.

According to an embodiment of the present invention, the rear panel comprises two substantially parallel rear concave portions, each rear concave portion dimensioned to receive the second portion of the arcuate arms of a rear wheel assembly when said rear wheel assembly is operated in the folded position.

According to an embodiment of the present invention, the rear wheel assembly further comprises a restraining member fixedly attached thereon, and the rear panel further comprises two substantially parallel rear restraining tracks, each rear restraining track arranged in relationship to a rear concave portion, and wherein when the second portion of the arcuate arms of the rear wheel assembly is located in the rear concave portion, the restraining member of the rear wheel assembly is adjacent to but spaced from the rear restraining track.

According to an embodiment of the present invention, when the cart is deployed in the open configuration, the rear panel and the front panel are substantially on a same plane to allow the rear rail section of each slide rail to extend to the rear panel, and when each of the rear wheel assemblies is operated in the folded position, the rear carrier is allowed to move between the front panel and the rear panel.

According to an embodiment of the present invention, each rear restraining track has a track end portion near the rear side, the track end portion arranged to receive the restraining member, and when the second portion of the arcuate arms of the rear wheel assembly are located in the rear concave portion and the restraining member of the rear wheel assembly is aligned with the track end portion, the rear wheel assembly is allowed to change from the folded position to the open position.

According to an embodiment of the present invention, when the rear wheel assembly is operated in the open position, the restraining member is located in the track end portion, preventing the rear carrier from moving toward the front side.

According to an embodiment of the present invention, the front panel comprises two substantially parallel front concave portions, each front concave portion in communication with a rear concave portion, each front concave portion dimensioned to receive the second portion of the arcuate arms of a rear wheel assembly when the rear carrier is located in the front panel.

According to an embodiment of the present invention, the front panel further comprises two substantially parallel front restraining tracks, each front restraining track arranged in relationship to a front concave portion, and wherein when the second portion of the arcuate arms of the rear wheel assembly are located in the front concave portion, the restraining member of the rear wheel assembly is adjacent to but spaced from the front restraining track.

According to an embodiment of the present invention, the rear carrier is located in the front panel, the restraining member of the rear wheel assembly and the front restraining track are arranged to prevent the rear wheel assembly from operating in the open position.

According to an embodiment of the present invention, the first portion of the arcuate arms is separated by each other by a separation distance smaller than the end distance of the arm-end parts, and each front wheel assembly further comprises a plate having a plate opening made thereon, the plate opening dimensioned to receive at least a part of the arcuate arms, the plate pivotably mounted on the wheel fork for movement between a first plate position near the first portion of the arcuate arms and a second plate position near the second portion of the arcuate arms for causing the arm-end parts to move through the front arm-receiving opening; and each rear wheel assembly further comprises a plate having a plate opening made thereon, the plate opening dimensioned_to receive at least a part of the arcuate arms, the plate pivotably mounted on the wheel fork for movement between a first plate position near the first portion of the arcuate arms and a second plate position near the second portion of the arcuate arms for causing the arm-end parts to move through the rear arm-receiving opening.

According to an embodiment of the present invention, when the cart is deployed in the open configuration, the rear panel and the front panel are substantially on a same plane to allow the rear rail section of each slide rail to extend to the rear panel, wherein the rear panel comprises two rail latches, each rail latch associated with a slide rail, and wherein when the rear rail section of the slide rail has extended to the rear panel to cause the restraining member of the rear wheel assembly to align with the track end portion, the rear rail section is arranged to latch onto the rail latch.

According to an embodiment of the present invention, the rear panel comprises a panel rim at the rear side, and wherein the two rail latches are made on the panel rim.

According to an embodiment of the present invention, when each of the front wheel assemblies is operated in the folded position, and the rear carrier is located in the front panel with each of the rear wheel assemblies operated in the folded position, the rear panel can be caused to move away from said same plane toward the front panel to deploy the cart in the folded configuration with the front panel facing the rear panel and each of the front wheel assemblies and each of the rear wheel assemblies located between the front panel and the rear panel.

According to an embodiment of the present invention, the handle comprises a first section, a second section, and a telescopic tube section for movably connecting between the first section and the second section to adjust a length of the handle, the first section pivotably mounted on the front carrier, and when the cart is deployed in the folded configuration, the length of the handle can be adjusted so that the second section is located between the front panel and the rear panel.

According to an embodiment of the present invention, wherein when each of the front wheel assemblies is operated in the open position, and each of the rear wheel assemblies is operated in the open position, the front wheel assemblies and the rear wheel assemblies are arranged to support the cart in the open configuration.

According to an embodiment of the present invention, each of the front wheel assemblies comprises a push plate pivotably mounted on the wheel fork, the push plate having a plate opening to receive the arcuate arms of the front wheel assembly, the push plate operable between a first position and in a second position, wherein when the push plate is in the first position, the plate opening is near the first portion of the arcuate arms, allowing the arm-end parts of the arcuate arms to rest on the front carrier on opposing sides of the front arm-receiving opening, and when the push plate is in the second position, the plate opening is arranged to cause the arm-end parts of the arcuate arms to move through the front arm-receiving opening; and each of the rear wheel assemblies comprises a push plate pivotably mounted on the wheel fork, the push plate having a plate opening to receive the arcuate arms of the rear wheel assembly, the push plate operable between a first position and in a second position, wherein when the push plate is in the first position, the plate opening is near the first portion of the arcuate arms, allowing the arm-end parts of the arcuate arms to rest on the rear carrier on opposing sides of the rear arm-receiving opening, and when the push plate is in the second position, the plate opening is arranged to cause the arm-end parts of the arcuate arms to move through the rear arm-receiving opening.

DETAILED DESCRIPTION OF THE INVENTION

The present invention provides a wagon or cart having a front panel hinged to a rear panel so that it can be folded into a folded configuration or can be opened into an open configuration. The wagon or cart in the open configuration can be used as a pulling wagon or cart with four wheels. In the description of the present invention, the terms "wagon" and "cart" are used interchangeable. Hereinafter the wagon or cart is referred to as the cart.

According to an embodiment of the present invention, each of the wheels is mounted on a wheel assembly. The wheel assembly can be operated in an open position or a folded position. When the cart is used for pulling, for example, all the wheel assemblies are operated in the open position. When the cart is folded into a folded configuration, all the wheel assembles are operated in the folded position. The two front wheel assemblies are mounted on a front carrier which is rotatably mounted on the front panel. The two rear wheel assemblies are mounted on a rear carrier. The rear carrier is fixedly mounted on two slide rails so it can move between the front panel and the rear panel. Each wheel assembly has a pair of arcuate arms and each carrier has two openings. Each of the openings is arranged to engage with the pair of arcuate arms of a wheel assembly. When the wheel assembly is operated in the open position, its arcuate arms are rest on the carrier on the opposing sides of the opening to support the cart. When the wheel assembly is operated in the folded position, its arcuate arms are caused to move through the opening for folding.

Figure 1:
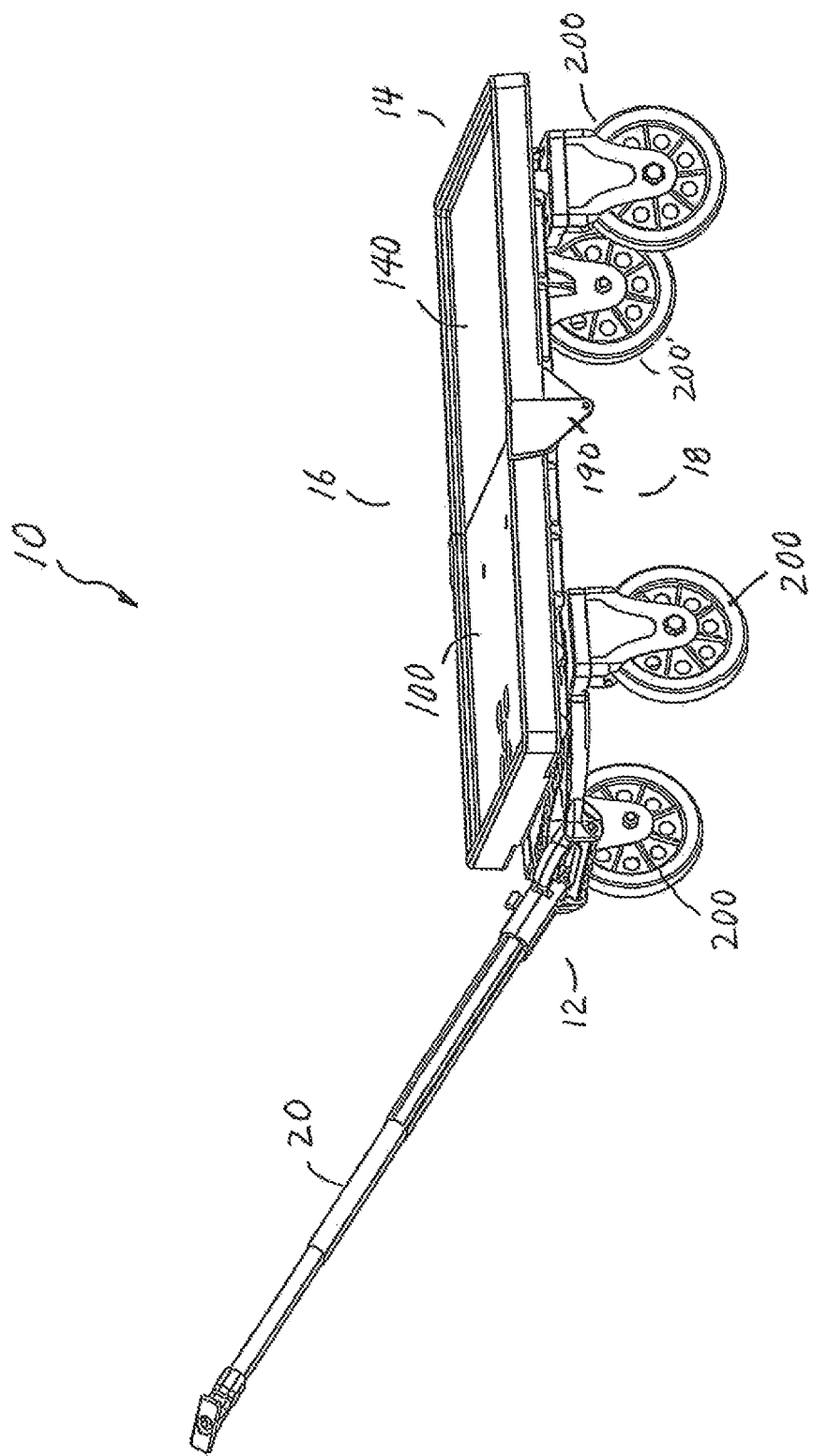
FIG. 1 is a perspective view of the cart in the open configuration, according to an embodiment of the present invention.

FIG. 1 shows a perspective view of the cart in the open configuration, according an embodiment of the present invention. As seen in FIG. 1, cart 10 has an upper side 16 with a front panel 100 and a rear panel 140 hinged to each other; a lower side 18 with four independently-operable wheel assemblies: two front wheel assemblies 200 and two rear wheel assemblies 200'. As seen in FIG. 1, cart 10 has a rear side 14 and a front side 12 with a handle 20. The front panel 100 and the rear panel 140 are substantially located on the same plane. The front panel 100 and the rear panel 140 are pivotably hinged to each other with a pair of panel hinges 190 for folding the cart into a folded configuration (see FIG. 15).

Figure 2:
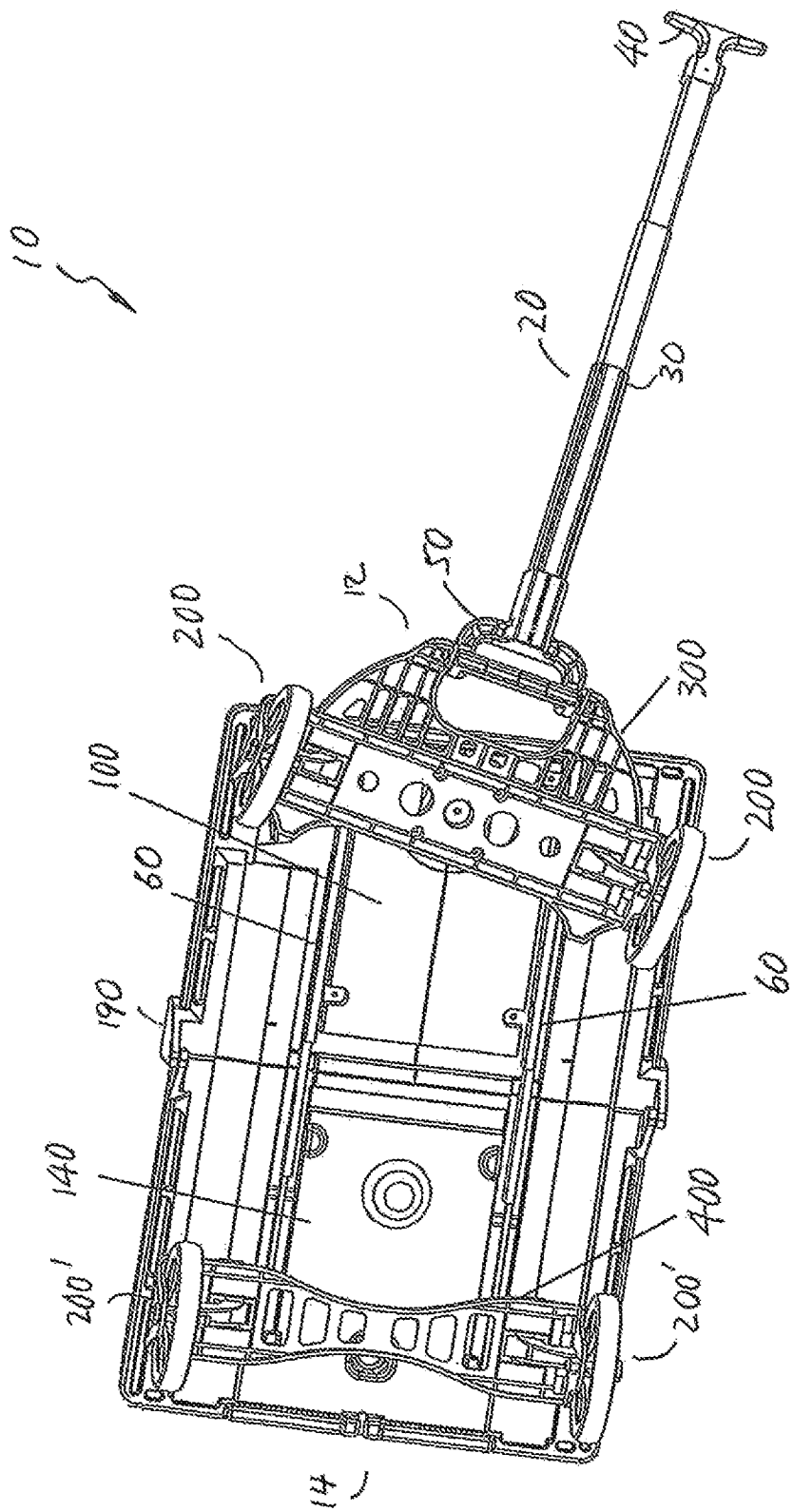
FIG. 2 is a bottom view of the cart in the open configuration.

FIG. 2 is a bottom view of cart 10. As seen in FIG. 2, the front side 12 of cart 10 has a front carrier 300 and the rear side 14 has a rear carrier 400. Cart 10 also has two slide rails 60 linking the front side 12 to the rear side 14 when cart 10 is in the open configuration. As seen in FIG. 2, the front carrier 300 is rotatably mounted on the front panel 100 and the rear carrier 400 slidably mounted on rear panel 140 on the slide rails 60. The front carrier 300 has two front wheel assemblies 200 and the rear carrier 400 has two rear wheel assemblies 200' mounted thereon. The panel hinges 190 are located on different sides of cart 10 to provide connection between front panel 100 and rear panel 140. Part of each slide rails 60 is fixedly mounted on the front panel 100. Slide rails 60 are extendable to allow the rear carrier 400 along with the two rear wheel assemblies 200' to move between the front panel 100 and the rear panel 140 when each of the rear wheel assemblies 200' is in a folded position (see FIGS. 13 and 14). As seen in FIG. 2, handle 20 has a telescoping tube portion 30 so that it can be shortened or lengthened. The handle 20 has a pulling handle 40 at its open end and a carrying handle 50 pivotably mounted on front carrier 300.

Figure 3:
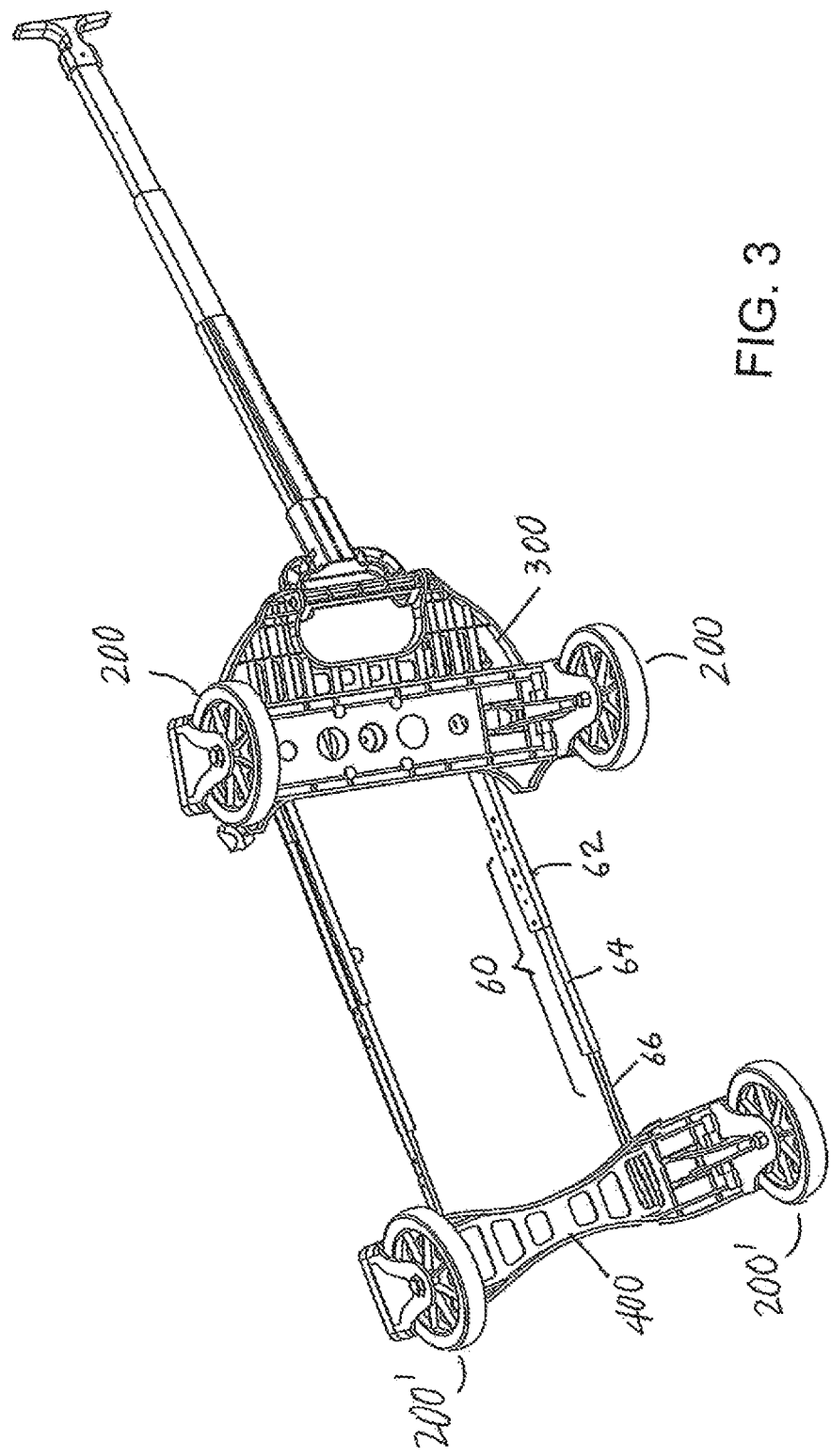
FIG. 3 is a bottom view of the cart with the front panel and the rear panel removed.

FIG. 3 shows a bottom view of cart 10 with front panel 100 and rear panel 140 removed to show the rail sections 62, 64 and 66 of slide rail 60. The rail section 62 is herein referred to as the front rail section, and rail sections 64, 66 are together referred to as the rear rail section. According to an embodiment of the present invention, rail section 64 is smaller in cross section than rail section 62. As such, rail section 64 can be at least partly retracted into rail section 62. Rail section 66 is smaller in cross section than rail section 64 so that rail section 66 can be at least partly retracted into the rail section 64. The rear carrier 400 is fixedly mounted on the two rail sections 66 as shown in FIG. 4.

Figure 4:
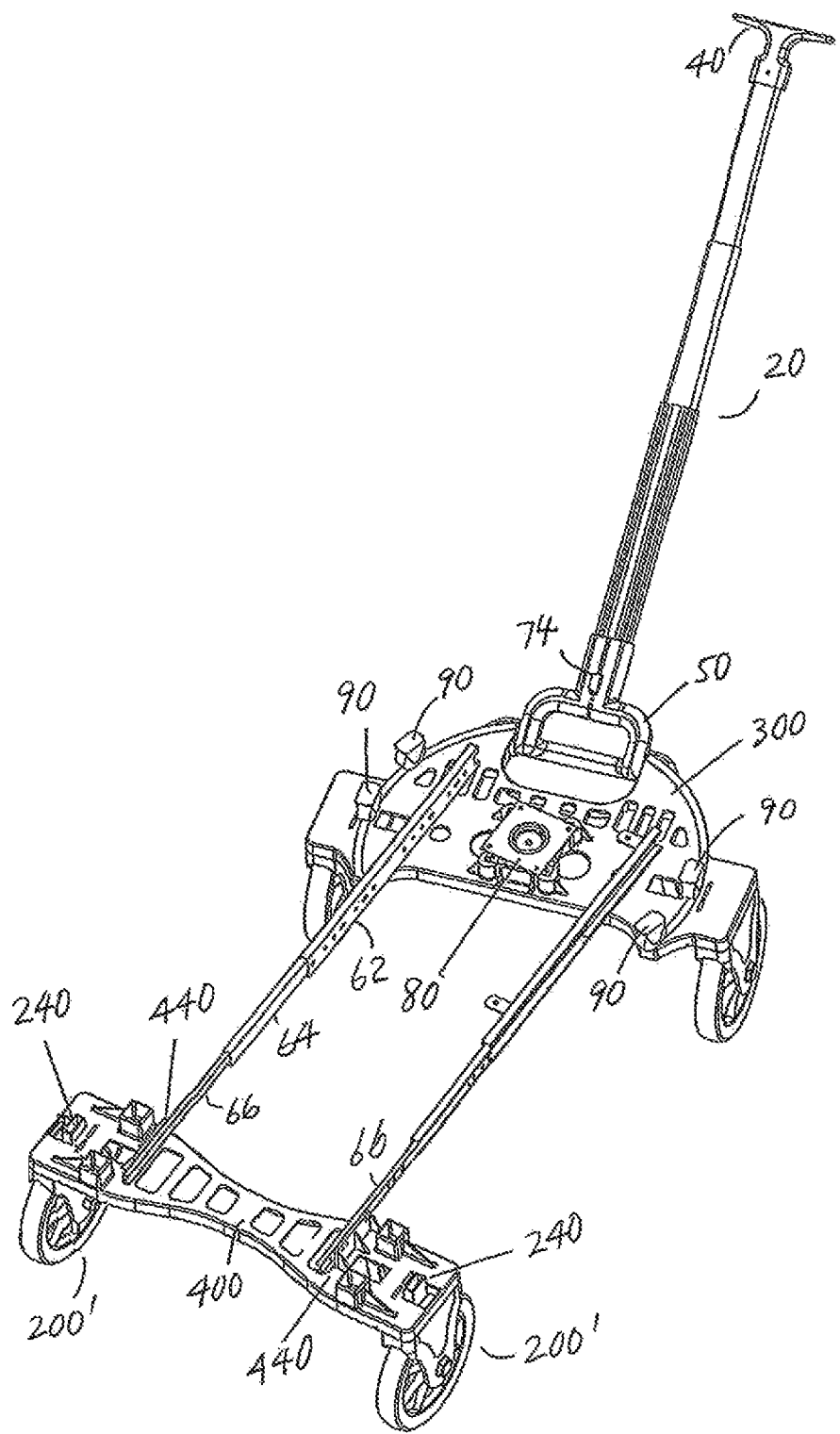
FIG. 4 is a top view of the cart with the front panel and the rear panel removed.
Figure 4A:
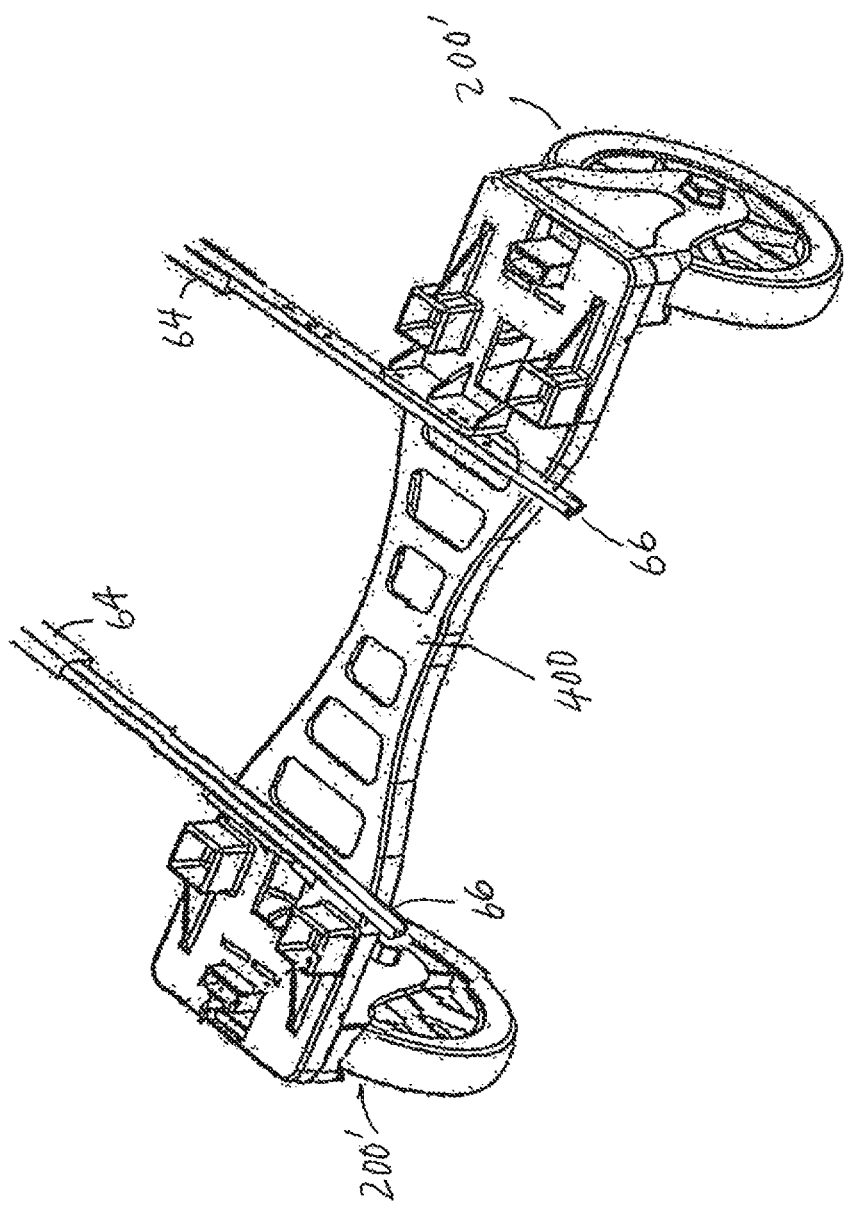
FIG. 4A illustrates part of top view showing a rail section, according to a different embodiment of the present invention.

FIG. 4 shows a top view of cart 10 with front and rear panels 100, 140 removed to show the end portion of each rail section 66 being fastened to a rail mount 440 on rear carrier 400. In a different embodiment of the present invention as shown in FIG. 4A, the end portion of each rail section 66 extends beyond the rear carrier 400.

Figure 15:
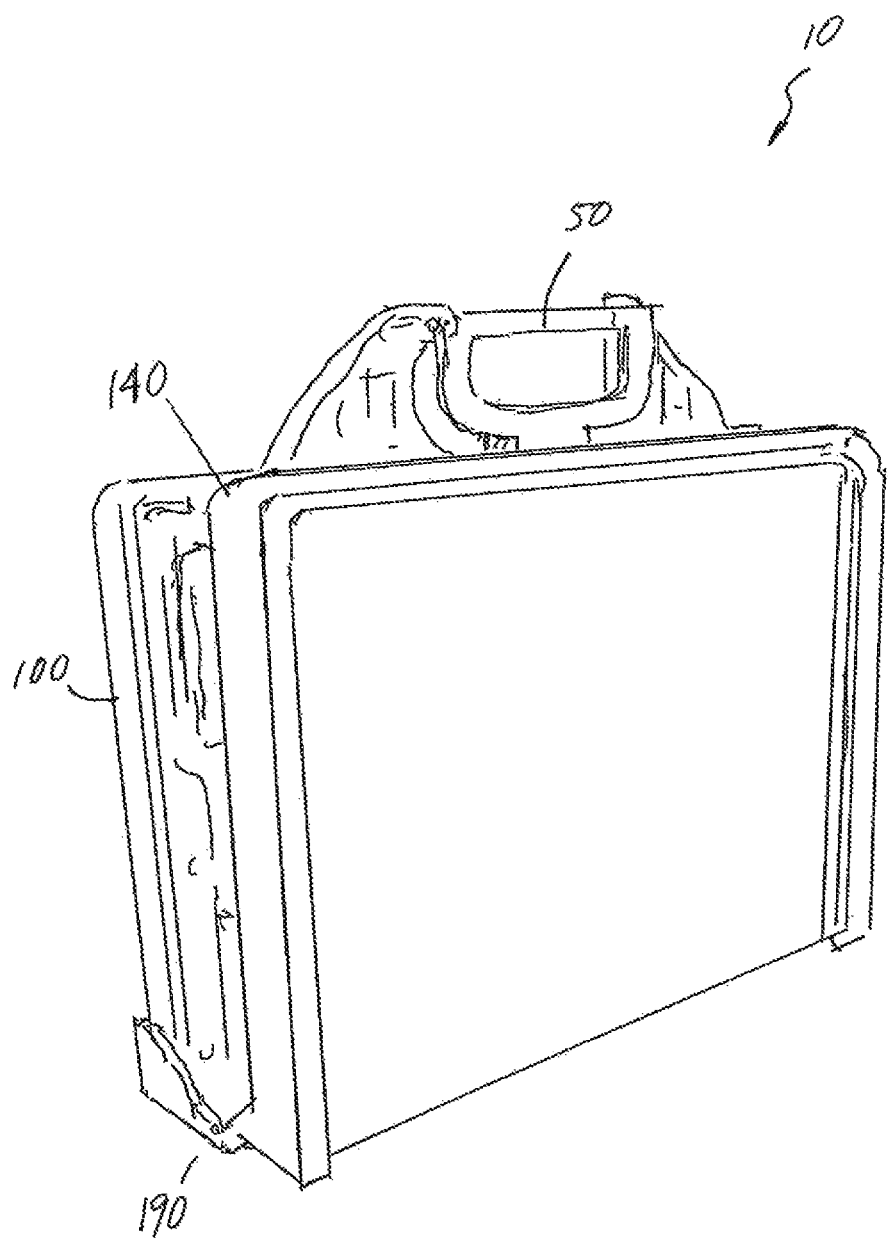
FIG. 15 is a side view of the cart in a folded configuration.

As seen in FIG. 4, a rotatable device 80 is mounted between the front panel 100 (not shown) and the front carrier 300 to allow the front carrier 300 along with two front wheel assemblies 200 to swivel relative to front panel 100. On the outer rim of front carrier 300, there are four casters 90. These casters 90 are separately placed on four caster pads 92 (see FIG. 5B). As such, the swiveling of front carrier 300 relative to front panel 100 can be carried out smoothly. As shown in FIG. 4, each of the rear wheel assemblies 200' has a restraining member 240. The restraining member 240 has a spatial relationship with the restraining tracks 120 on the front panel 100 (FIG. 5B) and the restraining tracks 160 on the rear panel 140 (FIG. 6B) when the rear wheel assemblies 200' are in the folded position. The restraining member 240 is also arranged to engage with a track end portion 162, 162' of the restraining track 160 (FIGS. 6B and 6C). As seen in FIG. 4, the carrying handle 50 of handle 20 has a snap stud 74 which is arranged to snap into a snap stud receiver 76 on the rear panel 140 (see FIG. 6B, for example) when the cart is in the folded configuration (FIG. 15).

Figure 5A:
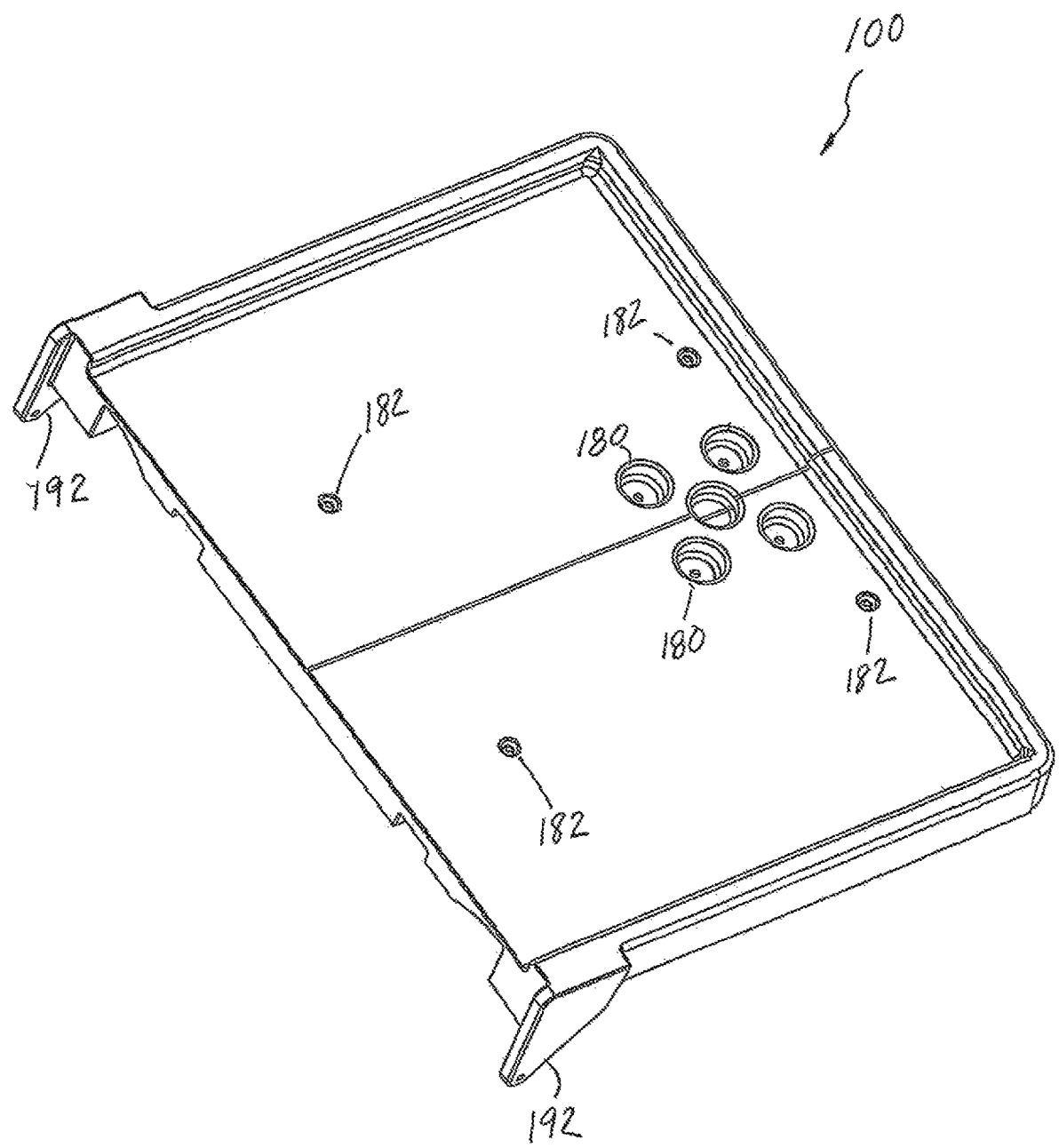
FIG. 5A is a top view of the front panel.

FIG. 5A is a top view of front panel 100. As seen in FIG. 5A, front panel 100 has two front hinge parts 192 of panel hinges 190 (see FIG. 1). Front panel 100 has four mounting holes 180 for mounting the rotatable device 80 (see FIG. 4), and four mounting holes 182 for fixedly mounting the rail sections 62 (see FIG. 4).

Figure 5B:
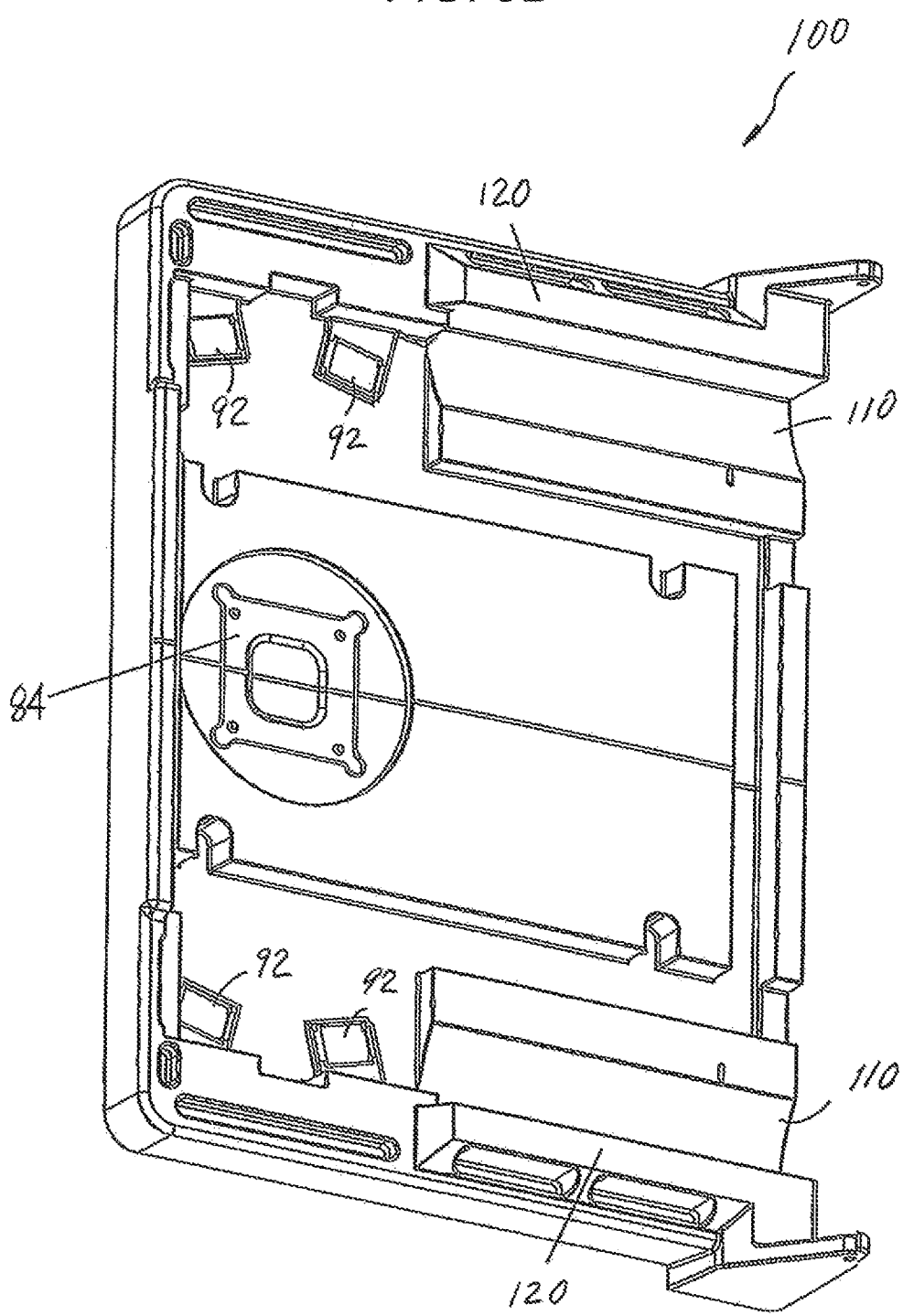
FIG. 5B is a bottom view of the front panel.

FIG. 5B is a bottom view of front panel 100. As seen in FIG. 5B, front panel 100 has a mounting pad 84 for mounting the rotatable device 80 (see FIG. 4). Front panel 100 has two concave portions 110, each of which is dimensioned to accommodate the arcuate arms 230 of a rear wheel assembly 200' (see FIG. 11) when the rear wheel assembly 200' is located in front panel 100 in a folded position (see FIG. 14). Front panel 100 also has two restraining tracks 120. Together with the restraining member 240 of each rear wheel assembly 200' (FIG. 11), the restraining tracks 120 prevent the two rear wheel assemblies 200' in the folded position from changing into the open position. Front panel 100 also has four caster pads 92 for placing the four casters 90 associated with the front carrier 300 (FIG. 4).

Figure 6A:
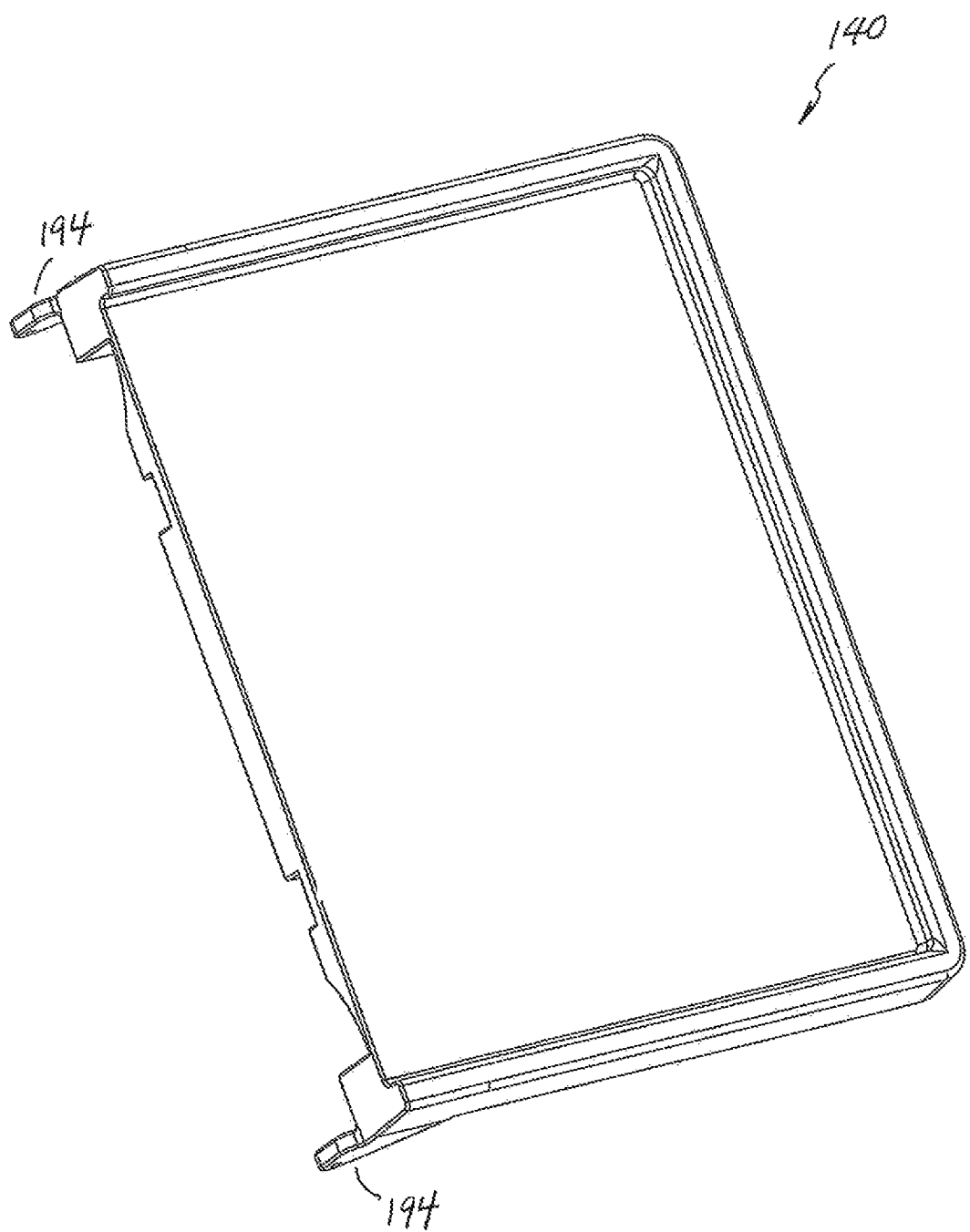
FIG. 6A is a top view of the rear panel.
Figure 6B:
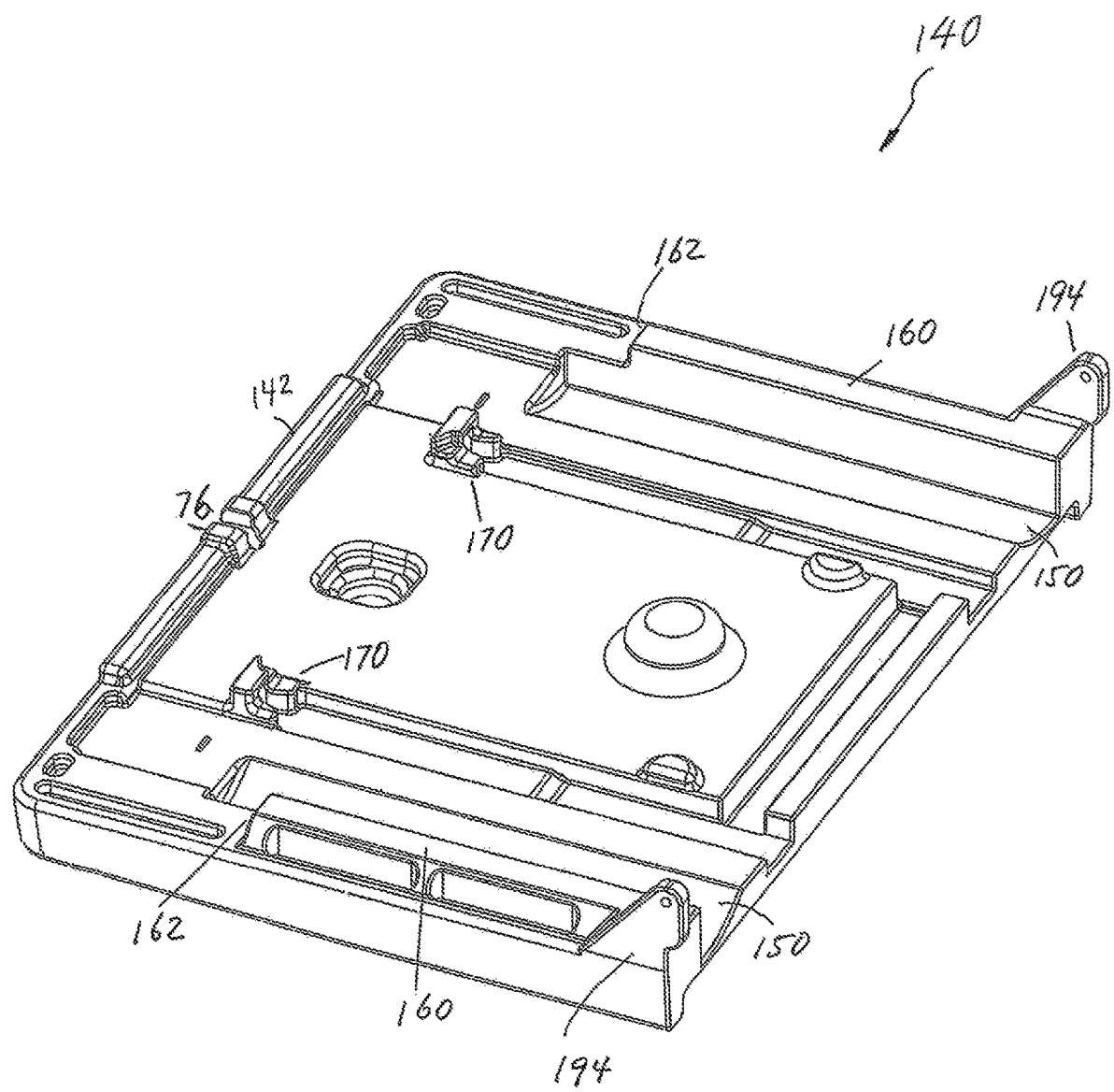
FIG. 6B is a bottom view of the rear panel.
Figure 6C:
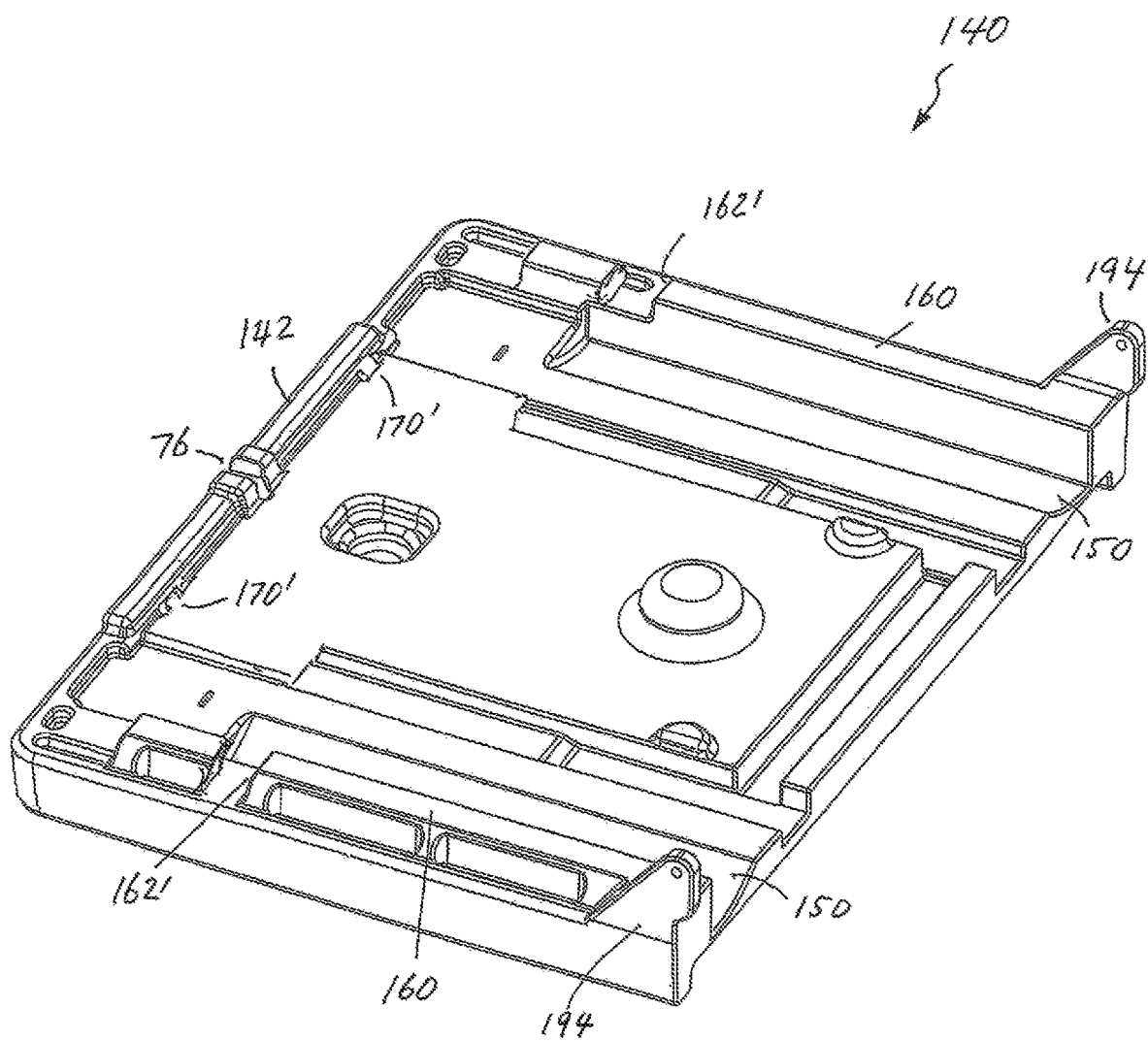
FIG. 6C is a bottom view of the rear panel, according a different embodiment of the present invention.

FIG. 6A is a top view of rear panel 140. As seen in FIG. 6A, rear panel 140 has two rear hinge parts 194 of panel hinges 190 (see FIG. 1).

FIG. 6B is a bottom view of rear panel 140, showing two rail latches 170 and a snap stud receiver 76. The rail latches 170 are fixedly mounted on the rear panel 140 and arranged to latch the rail sections 66 as described below. The snap stud receiver 76 is arranged on the rear panel rim 142 to receive the snap stud 74 on the carrying handle 50 (see FIG. 4). As seen in FIG. 6B, rear panel 140 has two concave portions 150, each of which is dimensioned to accommodate the arcuate arms 230 of a rear wheel assembly 200' when the rear wheel assemblies 200' are located in rear panel 140 in the folded position (see FIG. 13). Rear panel 140 also has two restraining tracks 160, each of which has a track end portion 162. The restraining tracks 160, together with the restraining members 240 of the rear wheel assemblies, are arranged to prevent the two rear wheel assemblies 200' from changing into the open position when the rear carrier 400 is not located at a predetermined location on rear panel 140. As the rear carrier 400, along with rails 66, is moved from front panel 100 to rear panel 140, each of rail sections 66 is latched onto a rail latch 170 when the rear carrier reaches the predetermined location. At the predetermined location, the restraining member 240 of each of two rear wheel assemblies 200' is aligned with the track end portion 162 of restraining track 160. The track end portion 162 is arranged to receive the restraining member 240 of the rear wheel assembly 200', allowing the rear wheel assemblies 200' to change from the folded position into the open position (see FIG. 2, for example). Furthermore, when the rear wheel assemblies 200' are in the open position, the position of restraining member 240 at the track end portion 162 prevents the rear wheel assemblies 200' from moving toward the front panel 100.

FIG. 6C is a bottom view of the rear panel 140, according to a different embodiment of the present invention. As seen in FIG. 6C, the rail latches 170' are located on the rear panel rim 142 for latching the end portion of rail sections 66 as shown in FIG. 4A. Furthermore, each of the track end portion 162' is dimensioned to receive the restraining member 240 of a rear wheel assembly 200'.

Figure 7A:
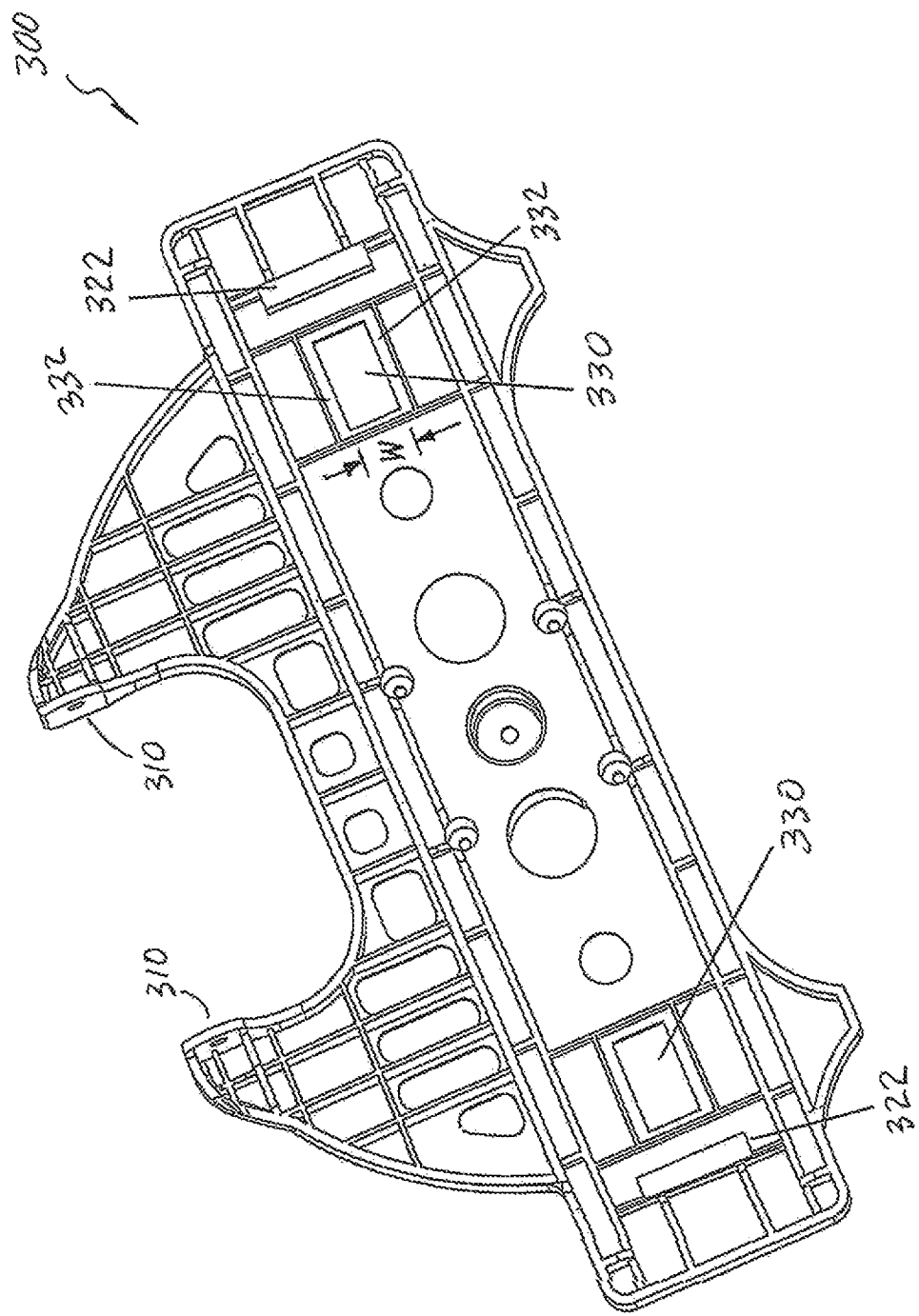
FIG. 7A is a bottom view of the front carrier.

FIG. 7A is a bottom view of front carrier 300. As seen in FIG. 7A, front carrier 300 has two hinge parts 322 for pivotably mounting two front wheel assemblies 200 and two mounting holes 310 for pivotably mounting the carrying handle 50 (see FIG. 2). Front carrier 300 also has two front arm-receiving openings 330. Each front arm-receiving opening 330 is dimensioned to receive the arcuate arms 230 of a front wheel assembly 200 (see FIGS. 9 and 10) when the front wheel assembly 200 is in the folded position. As seen in FIG. 7A, each of the front arm-receiving opening 330 has a width W and two opposing sides 332 dimensioned to engage with the arcuate arms 230 of a front wheel assembly 200 as described in conjunction with FIGS. 12A to 12C below.

Figure 7B:
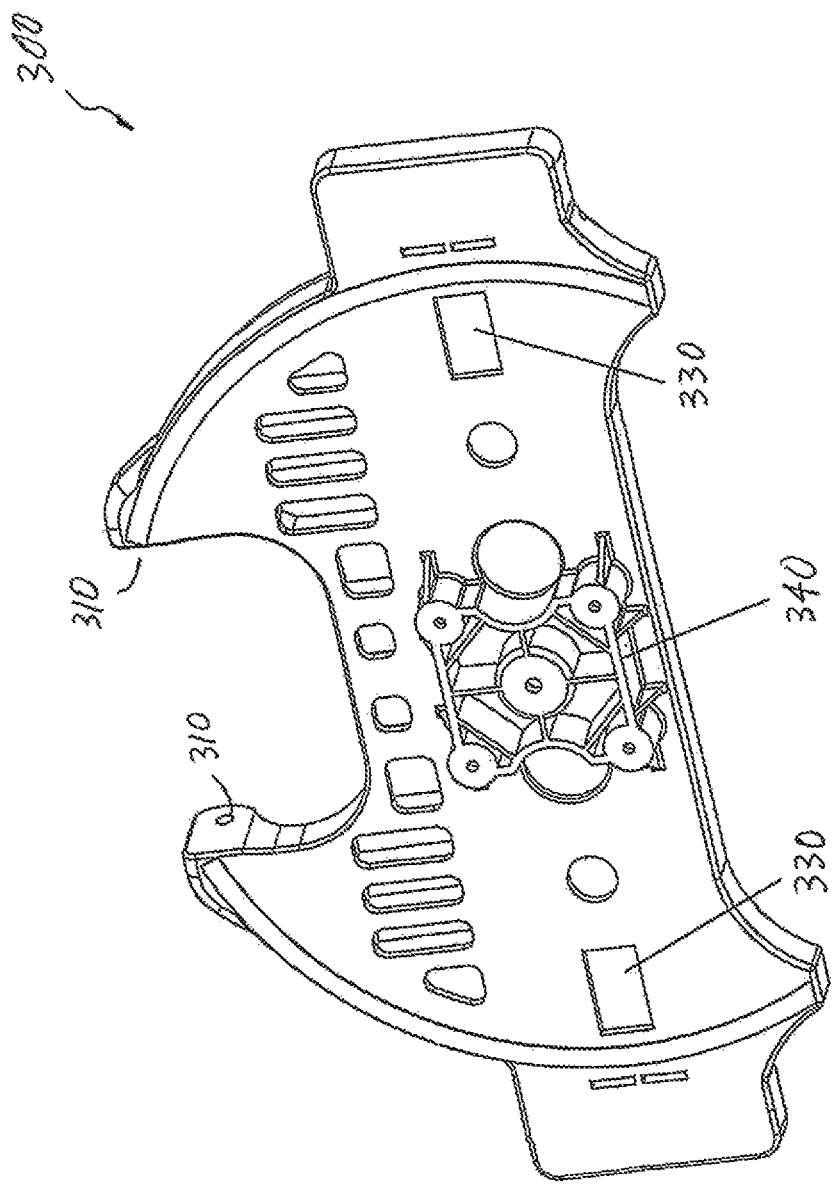
FIG. 7B is a top view of the front carrier.

FIG. 7B is a top view of front carrier 300. As seen in FIG. 7B, front carrier 300 has a mounting pad 340 for fixedly mounting the rotatable device 80 (see FIG. 4).

Figure 8A:
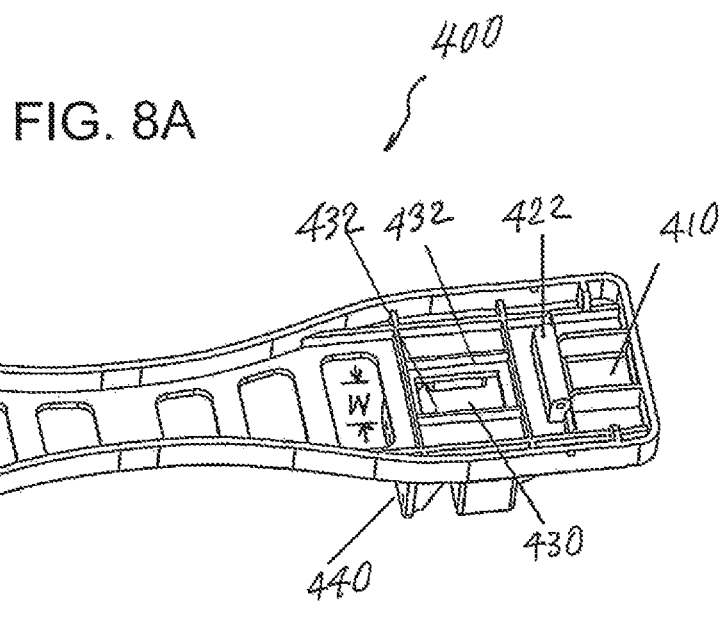
FIG. 8A is a bottom view of the rear carrier.

FIG. 8A is a bottom view of rear carrier 400. As seen in FIG. 8A, rear carrier 400 has two hinge parts 422 for rotatably mounting two rear wheel assemblies 200'. Rear carrier 400 also has two rear arm-receiving openings 430. Each rear arm-receiving opening 430 is dimensioned to receive the arcuate arms 230 of the rear wheel assemblies 200' (see FIG. 11) when the rear wheel assembly 200' is in the folded position. As seen in FIG. 8A, each of the rear arm-receiving opening 430 has a width W and two opposing sides 432 dimensioned to engage with the arcuate arms 230 of a rear wheel assembly 200' as described in conjunction with FIGS. 12A to 12C below.

Figure 8B:
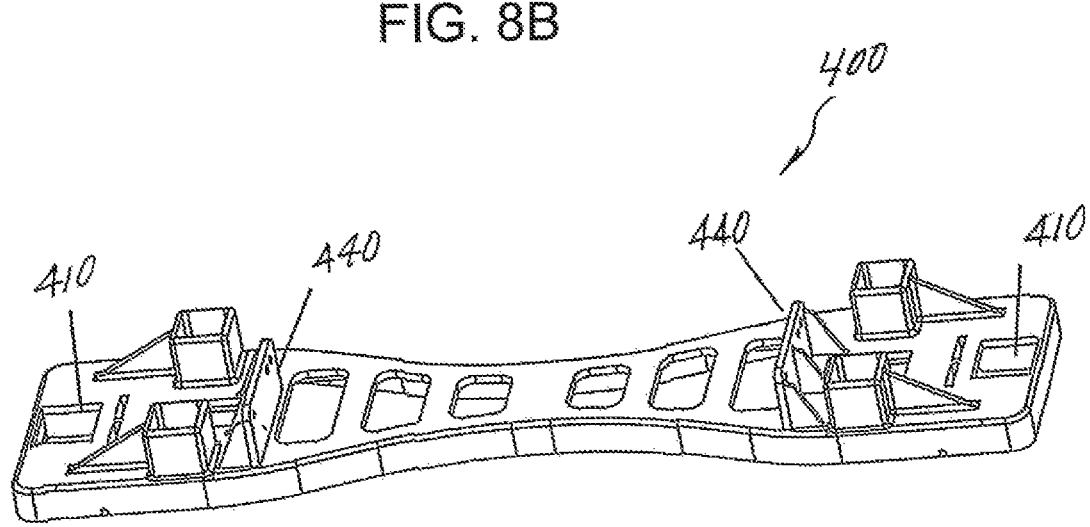
FIG. 8B is a side view of the rear carrier showing the bottom side thereof.

FIG. 8B is a top view of rear carrier 400. As seen in FIG. 8B, rear carrier 400 has two rail mounts 440 for fixedly mounting the end portion of the rail sections 66 (see FIGS. 4 and 4A). Rear carrier 400 also has two openings 410 to receive restraining members 240 of the rear wheel assemblies 200' when the rear wheel assemblies 200' are in the open position.

Figure 9:
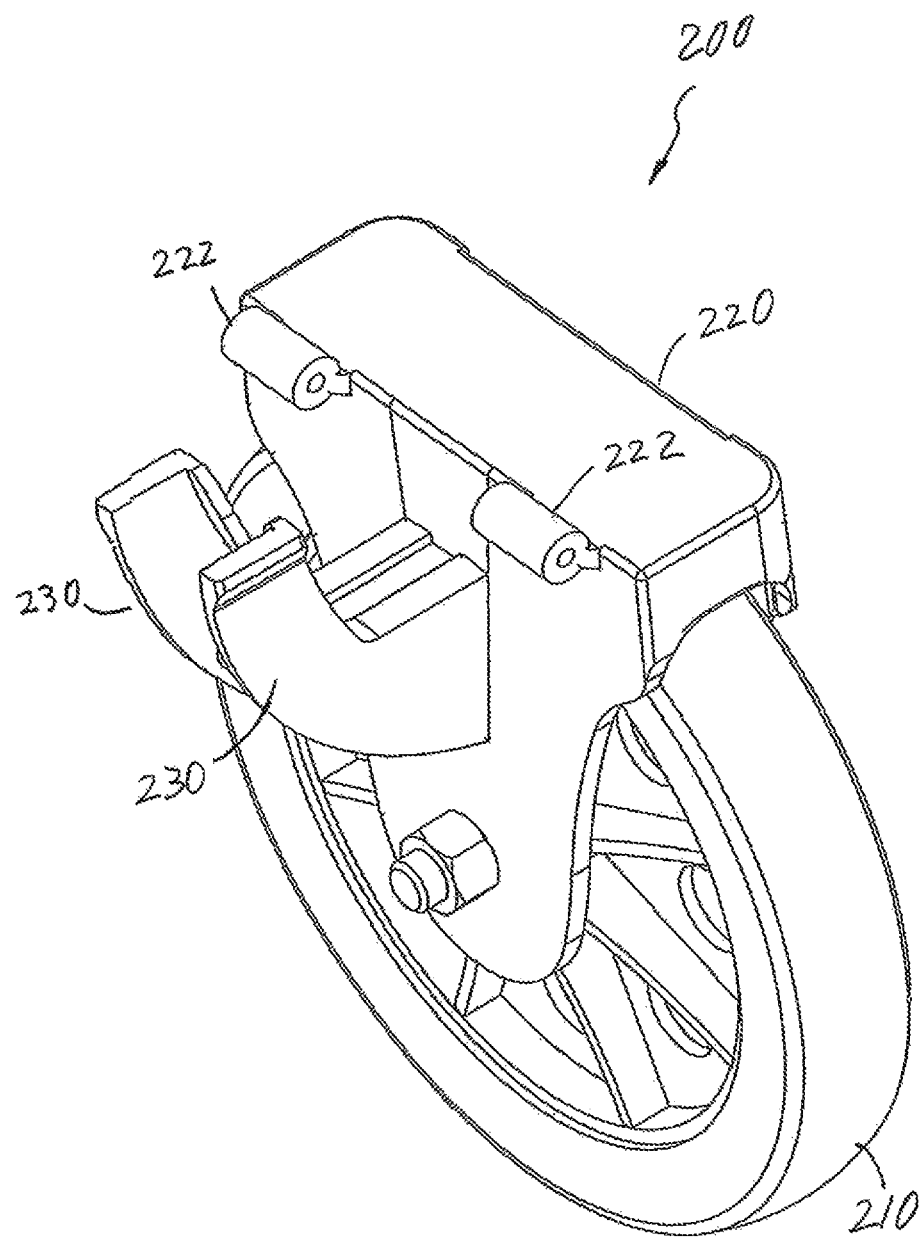
FIG. 9 is a side view of a front wheel assembly.
Figure 10:
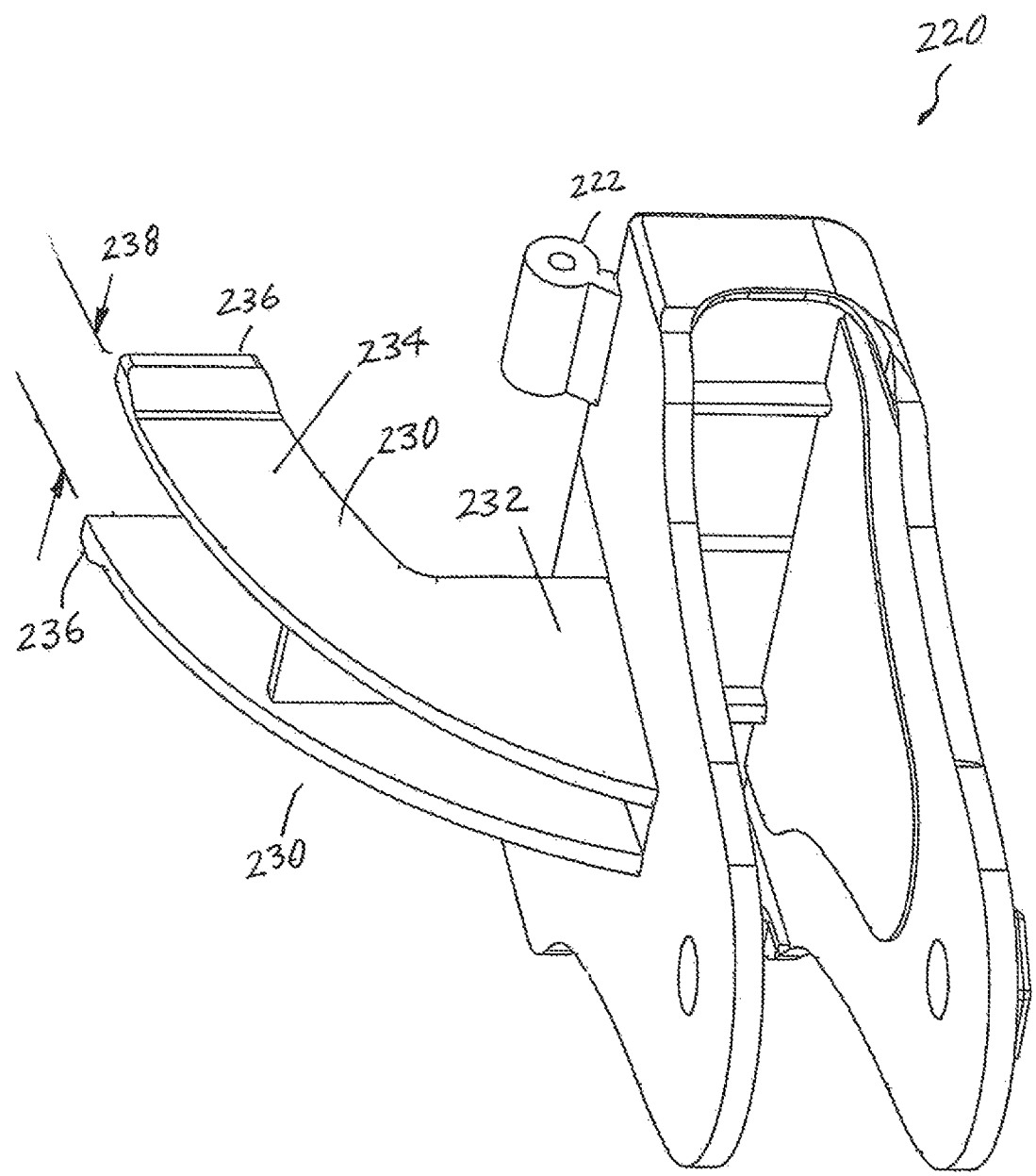
FIG. 10 is a side view of a front wheel assembly without a wheel.

FIG. 9 is a side view of a front wheel assembly 200. FIG. 10 is a side view of the front wheel assembly 200 without a wheel 210. The front wheel assembly 200 has a wheel fork 220 for mounting a wheel 210 and two hinge parts 222 arranged to cooperate with a hinge part 322 on front carrier 300 for mounting (see FIG. 7A). The front wheel assembly 200 has a pair of arcuate arms 230. As seen in FIG. 10, the two arcuate arms 230 has a first portion 232 fixedly attached to the wheel fork 220 and a second portion 234 ended with two arm-end parts 236. The arcuate arms 230 are substantially parallel to each other but the second portion 234 is slightly curved outward such that the distance 238 between the arcuate arms at the second portion 234 is slightly greater than the width, W, of the front arm-receiving openings 330 on the front carrier 300 (see FIG. 7A).

Figure 11:
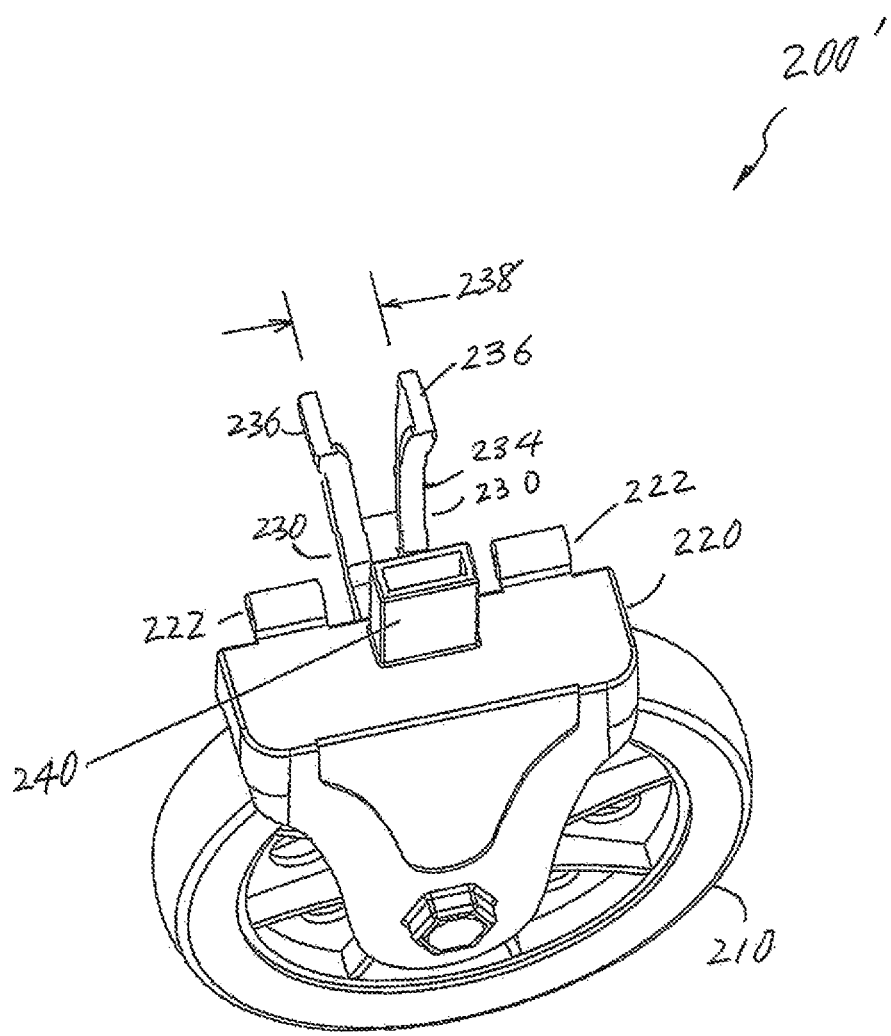
FIG. 11 is a side view of a rear wheel assembly.

FIG. 11 is a side view of a rear wheel assembly 200'. The rear wheel assembly 200' is essentially the same as the front wheel assembly 200 as shown in FIGS. 9 and 10, except that the rear wheel assembly 200'h as a restraining member 240 fixedly attached on the wheel fork 220. As with the arcuate arms on the front wheel assembly 200, the arcuate arms 230 on the rear wheel assembly 200' are substantially parallel to each other but the second portion 234 is slightly spreading outward such that the distance 238 between the arcuate arms at the second portion 234 is slightly greater than the width of the rear arm-receiving openings 430 of the rear carrier 400 (see FIG. 8A).

Figure 12A:
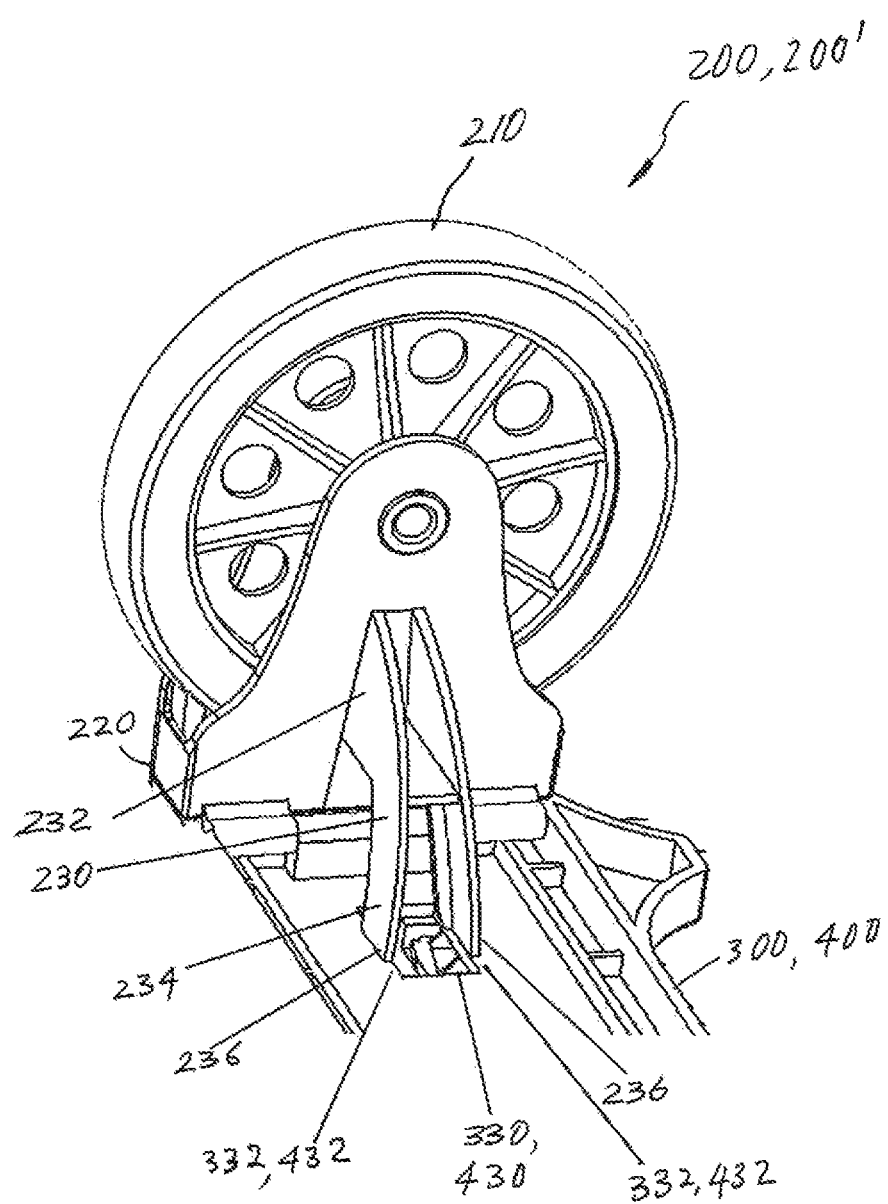
FIG. 12A is a side view of a wheel assembly with part of the front carrier.

FIG. 12A is a side view of a wheel assembly positioned in relationship to a carrier when the wheel assembly is in the open position. The wheel assembly can be a front wheel assembly 200 on the front carrier 300, or a rear wheel assembly 200' of the rear carrier 400. Thus, as seen in 12A, the arm-end parts 236 of the arcuate arms 230 are arranged to rest on the opposing sides 332 of the front arm-receiving opening 330 of the front carrier 300 (see FIG. 7A). Likewise, the arm-end parts 236 of the arcuate arms 230 are arranged to rest on the opposing sides 432 of the rear arm-receiving opening 430 of the rear carrier 400 (see FIG. 8A).

The arcuate arms 230 are slightly flexible. In order to change the front wheel assembly 200 from the open position to the folded position, the second portion 234 of the arcuate arms 230 of the front wheel assembly 200 can be squeezed toward each other to reduce the distance 238 (see FIG. 10) for allowing the arcuate arms to move through the front arm-receiving opening 330. As such, the wheel fork 220 of the front wheel assembly 200 can be moved toward the front carrier 300 to the folded position. Likewise, in order to change the rear wheel assembly 200' from the open position to the folded position, the second portion 234 of the arcuate arms 230 can be squeezed toward each other to reduce the distance 238 (see FIG. 11) for allowing the arcuate arms 230 to move through the rear arm-receiving opening 430. As such, the wheel fork 220 of the rear wheel assembly 200' can be moved toward the rear carrier 400 to the folded position.

Figure 13:
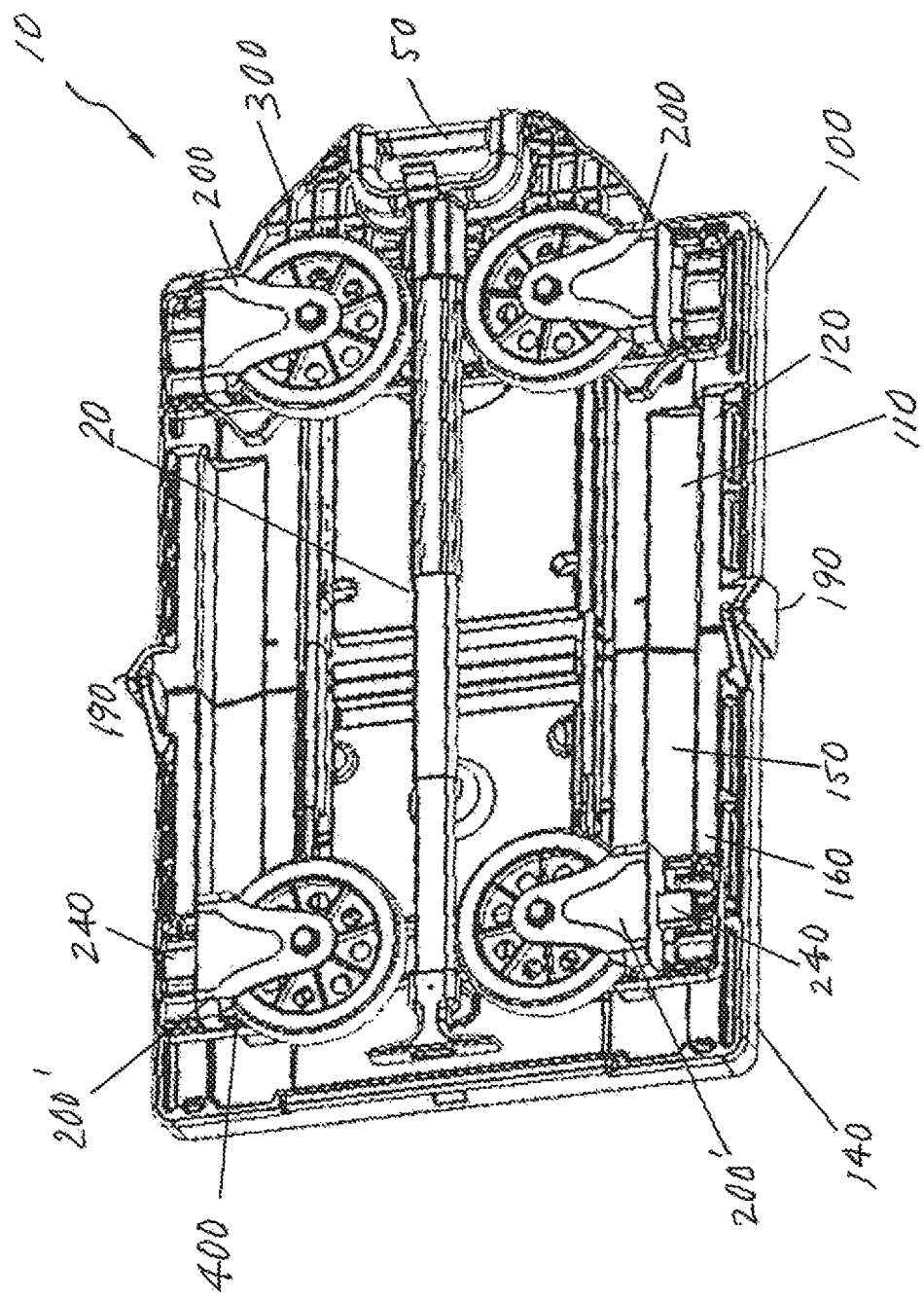
FIG. 13 is a bottom view of the cart with wheel assemblies in the folded position.

It should be noted that, because of the restraining member 240 of the rear wheel assembly 200' and the restraining track 160 of the rear panel 140, the rear wheel assembly 200' can be in the open position only when the restraining member 240 is aligned with the track end portion 162 or 162' and the rear carrier 400 is secured to the rear panel 140 with the end portion of each rail section 66 is latched onto the latch 170 or 170' (FIGS. 6B and 6C). When the rear wheel assembly 200' is in the open position, the restraining member 240 is located in the track end portion 162 or 162'. As such, the rear wheel assembly 200' in the open position cannot move toward the front panel 100. When the rear wheel assembly 200' is in the folded position, the restraining member 240 is moved out of the track end portion 162 or 162' and is substantially parallel to the surface of the restraining track 160 as shown in FIG. 13. According to the present invention, the restraining member 240 is adjacent to but spaced from the surface of the restraining track 160 so that the rear wheel assemblies 200', along with the rear carrier 400 can be caused to move toward the front panel 100. To accommodate the arcuate arms 230 of each rear wheel assembly 200' in the folded position, the rear panel 140 has two substantially parallel concave portions 150 positioned in relationship to the restraining tracks 160 (see FIGS. 6B and 6C). The concave potion 150 is dimensioned to receive the arcuate arms 230 when the rear wheel assembly 200' is caused to move toward to the front panel 100. Similarly, the front panel 100 has two substantially parallel concave portions 110 in communication with the concave portions 150 of the rear panel 140 (see FIG. 13) so as to receive the arcuate arms 230 when the rear wheel assembly 200' moved into the front panel 100. The front panel 100 also has two substantially parallel restraining tracks 120 along the concave portions 110. The restraining tracks 120 prevent the rear wheel assemblies 200' from operating in the open position when the rear wheel assemblies 200' are located in the front panel 100 as shown in FIG. 14.

Figure 12B:
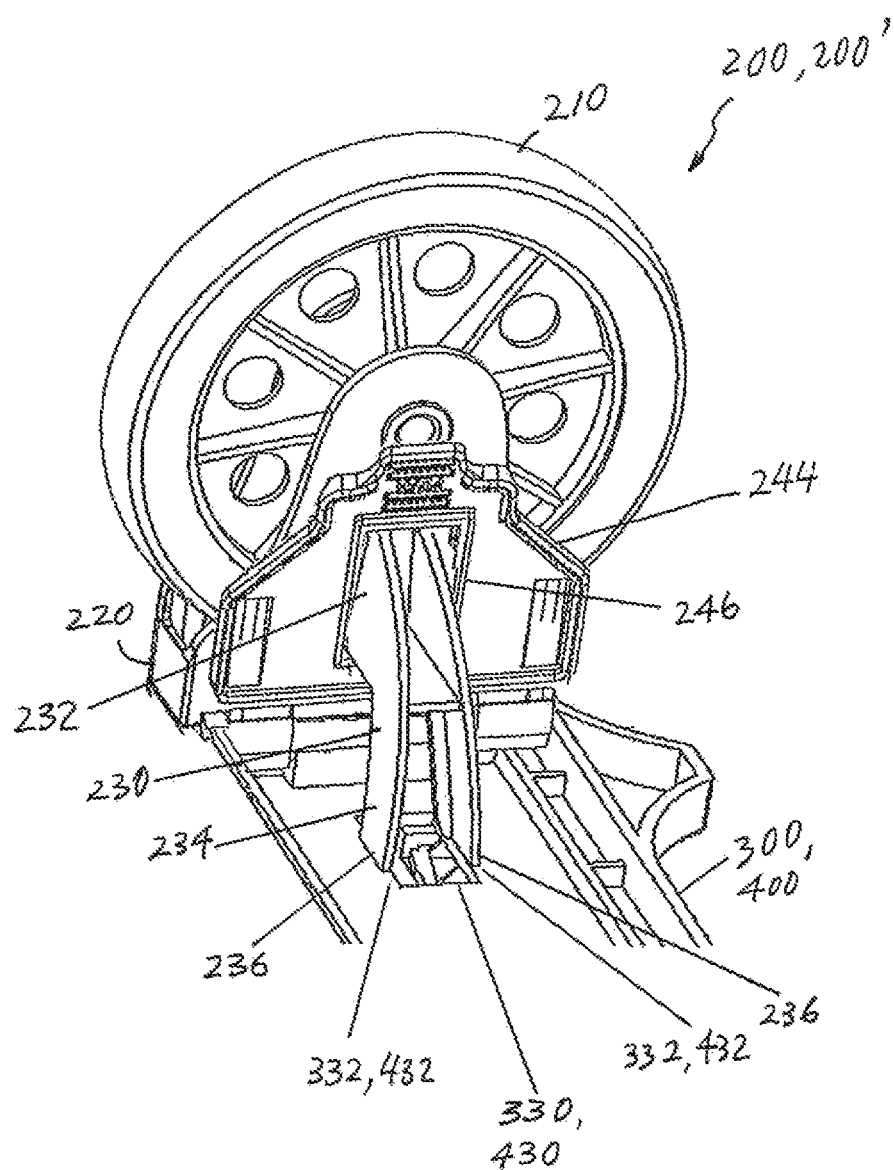
FIG. 12B is a side view of a wheel assembly having a push plate in the first position.
Figure 12C:
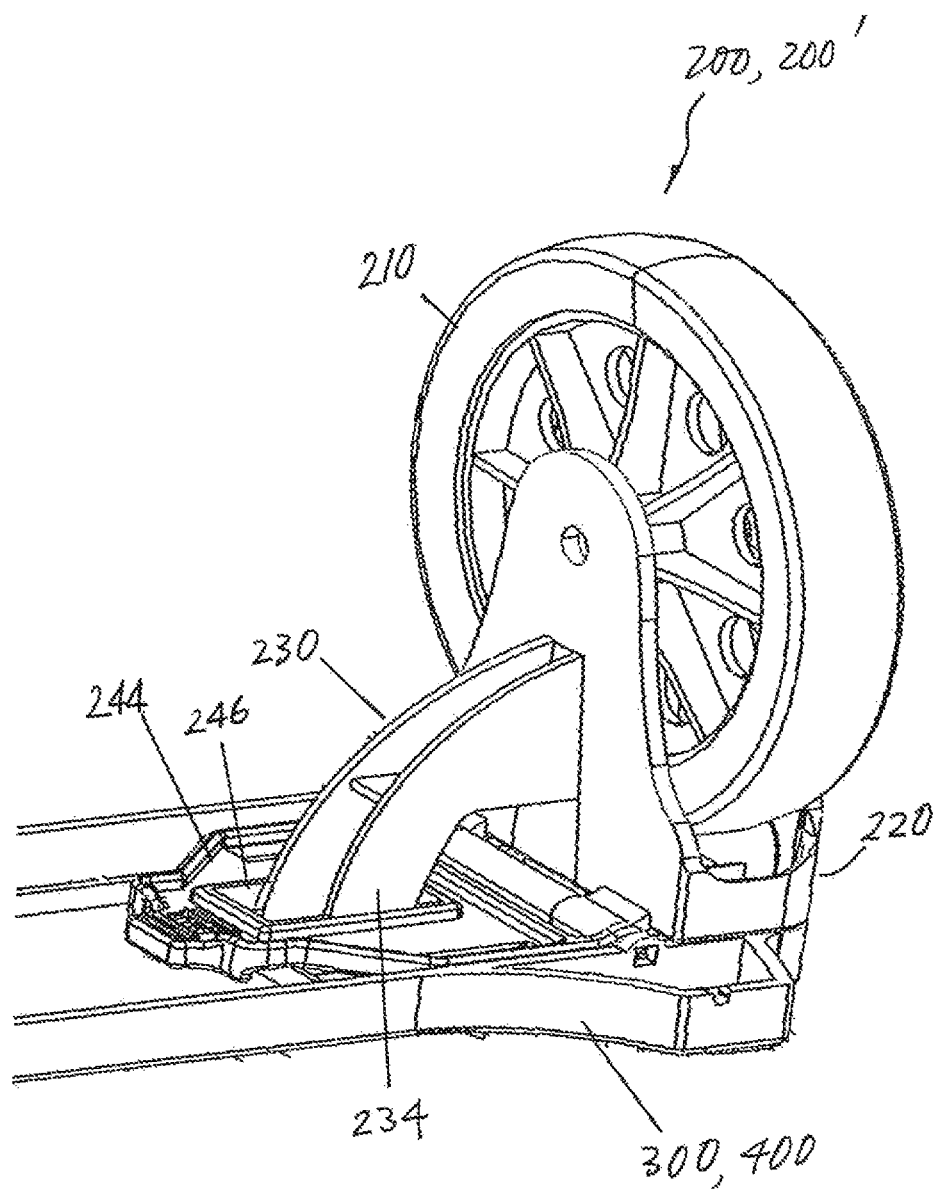
FIG. 12C is a side view of a wheel assembly having the push plate in the second position.

FIGS. 12B and 12C show the wheel fork 220 of the front wheel assembly 200 or the rear wheel assembly 200', according to an embodiment of the present invention. As shown in FIGS. 12B and 12C, the wheel fork 220 has a push plate 244 configured to squeeze the second portion 234 of the arcuate arms 230 and push the arm-end parts 236 through the front arm-receiving opening 330 on the front carrier 300 or the rear arm-receiving opening 430 on the rear carrier 400. As shown in FIG. 12B, the push plate 244 has a plate opening 246 to receive the arcuate arms 230. The push plate 244 is pivotably mounted on the wheel fork 220 for movement between a first plate position as shown in FIG. 12B and a second plate position as shown in FIG. 12C. When the push plate 244 is located at the first position near the first portion 232 of the arcuate arms 230, the arm-end parts 236 of the arcuate arms 230 are arranged to rest on the opposing sides 332 of the front arm-receiving opening 330 of the front carrier 300 (see FIG. 7A). Likewise, the arm-end parts 236 of the arcuate arms 230 are arranged to rest on the opposing sides 432 of the rear arm-receiving opening 430 of the rear carrier 400 (see FIG. 8A). When the push plate 244 is located at the second position near the second portion 234 of arcuate arms 230, the opening 246 of push plate 244 is dimensioned to cause the arcuate arms at the second portion 234 to move toward each and to push the arm-end parts 236 through the front arm-receiving opening 330 of the front carrier 300. Likewise, when the push plate 244 is located at the second position near the second portion 234 of arcuate arms 230, the opening 246 of the push plate 244 is dimensioned to cause the arcuate arms at the second portion 234 to move toward each and to push the arm-end parts 236 through the rear arm-receiving opening 430 of front carrier 400. As such, the wheel assembly 200 or 200' can be pushed toward the carrier into the folded position.

FIG. 13 shows cart 10 in the open configuration with all wheel assemblies in the folded position. As seen in FIG. 13, the folded rear wheel assemblies 200', along with the rear carrier 400, are located in rear panel 140. Each of the concave portions 110 on the front panel 100 is aligned to or in communication with a concave portion 150 of the rear panel 140. Each of the restraining tracks 120 on the front panel 100 is also aligned to a restraining track 160 of the rear panel 140. The rear wheel assemblies 200' along with the rear carrier 400 can be caused to move toward the front panel 100.

Figure 14:
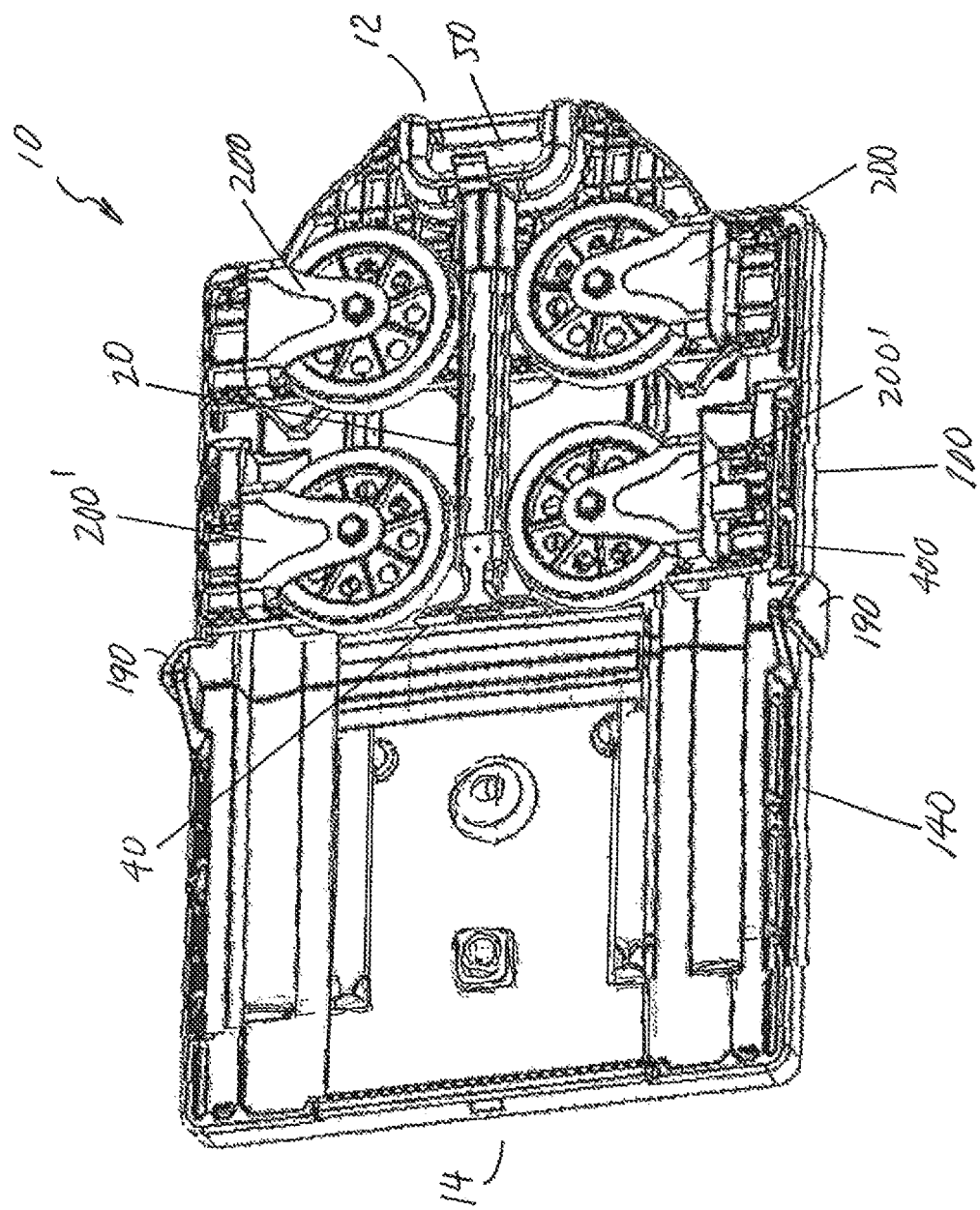
FIG. 14 is a bottom view of the cart with rear wheel assemblies and rear carrier moved to the front panel.

FIG. 14 shows cart 10 in the open configuration with all wheel assemblies in the folded position. As seen in FIG. 13, the folded rear wheel assemblies 200', along with the rear carrier 400, are located in front panel 100. Furthermore, the handle 20 has been retracted and the pulling handle 40 is tugged inside the front panel 100. As such, the real panel 140 can be folded toward the front panel 100 to deploy the cart 10 in the folded configuration.

FIG. 15 shows the car in the folded configuration. As seen in FIG. 15, the front panel 100 and the rear panel 140 are facing each other in a substantially parallel position. As described in conjunction with FIGS. 4 and 6B above, the snap stud in carrying handle 50 can be inserted into the snap stud receiver 76 on the rear panel 140. With a pair of sturdy hinges 190, the cart 10 in the folded configuration is a small, sturdy unit which can be conveniently carried around using the carrying handle 50 or to be stowed in a small space.

In summary, the present invention provides a cart having a front panel hinged to a rear panel. The cart has a pair of slide rails, each of which has a front rail section fixedly attached to the front panel and a rear rail section extendable to the rear panel. The cart has a front carrier rotatably mounted on the front panel and a rear carrier fixedly attached to the rear rail section so that the rear carrier can be moved between the first panel and the second panel. Each of the carriers has two wheel assemblies privotably mounted thereon. Each wheel assembly has a wheel fork for mounting a wheel and two arcuate arms fixedly attached to the wheel fork. Each carrier has two arm-receiving openings for engaging with the arcuate arms of the wheel assemblies. When the wheel assembly is in an open position, the arcuate arms are arranged to rest on the carrier on opposing sides of the arm-receiving opening. When the wheel assembly is in a folded position, the arcuate arms are received into the arm-receiving opening.

It should be noted that the cart, according the embodiments of the present invention, has various components such as hinges, mechanical mounts, rotatable devices and the like for assembling the panels, the carriers, the rails and the wheel assemblies into a foldable cart. However, these various components can be replaced, modified or placed differently within changing the invention as claimed.

Thus, although the present invention has been described with respect to one or more embodiments thereof, it will be understood by those skilled in the art that the foregoing and various other changes, omissions and deviations in the form and detail thereof may be made without departing from the scope of this invention.

What is claimed is:

1. A cart constructed for deployment between a folded configuration and an open configuration, said cart comprising:
   a front side and an opposing rear side;
   a front panel and a rear panel hinged to the front panel for facilitating the deployment between the folded configuration and the open configuration;
   a pair of slide rails, each having a front rail section fixedly attached to the front panel and a rear rail section extendable to the rear panel;
   a front carrier rotatably mounted on the front panel, the front carrier having two front arm-receiving openings made thereon, each front arm-receiving opening having a width;
   a handle pivotably mounted on the front carrier near the front side of the cart;
   a rear carrier fixedly attached to the rear rail section, the rear carrier having two rear arm-receiving openings made thereon, each rear arm-receiving opening having a width;
   a pair of front wheel assemblies pivotably mounted on the front carrier, each front wheel assembly operable in a folded position and an open position, wherein each front wheel assembly comprises a wheel fork dimensioned for mounting a wheel and a pair of arcuate arms, the arcuate arms having a first portion fixedly amounted on the wheel fork, and a second portion having two arm-end parts separated by a distance greater than the width of the front arm-receiving opening, wherein when the front wheel assembly is operated in the open position, the two arm-end parts of the arcuate arms are arranged to rest on the front carrier on opposing sides of the front arm-receiving opening, and wherein the arcuate arms can be squeezed toward each other to reduce the distance for allowing the arcuate arms to move through the front arm-receiving opening so as to change the front wheel assembly from the open position to the folded position; and
   a pair of rear wheel assemblies pivotably mounted on the rear carrier, each rear wheel assembly operable in a folded position and an open position, wherein each rear wheel assembly comprises a wheel fork for mounting a wheel and a pair of arcuate arms, the arcuate arms having a first portion fixedly mounted on the wheel fork, and a second portion having two arm-end parts separated by an end distance greater than the width of the rear arm-receiving opening, wherein when the rear wheel assembly is operated in the open position, the two arm-end parts of the arcuate arms are arranged to rest on the rear carrier on opposing sides of the rear arm-receiving opening, and wherein the arcuate arms can be squeezed toward each other to reduce the end distance for allowing the arcuate arms to move through the rear arm-receiving opening so as to change the rear wheel assembly from the open position to the folded position.

2. The cart according to claim 1, wherein the rear panel comprises two substantially parallel rear concave portions, each rear concave portion dimensioned to receive the second portion of the arcuate arms of a rear wheel assembly when said rear wheel assembly is operated in the folded position.

3. The cart according to claim 2, wherein the rear wheel assembly further comprises a restraining member fixedly attached thereon, and the rear panel further comprises two substantially parallel rear restraining tracks, each rear restraining track arranged in relationship to a rear concave portion, and wherein when the second portion of the arcuate arms of the rear wheel assembly is located in the rear concave portion, the restraining member of the rear wheel assembly is adjacent to but spaced from the rear restraining track.

4. The cart according to claim 3, wherein when the cart is deployed in the open configuration, the rear panel and the front panel are substantially on a same plane to allow the rear rail section of each slide rail to extend to the rear panel, and when each of the rear wheel assemblies is operated in the folded position, the rear carrier is allowed to move between the front panel and the rear panel.

5. The cart according to claim 3, wherein each rear restraining track has a track end portion near the rear side, the track end portion arranged to receive the restraining member, and when the second portion of the arcuate arms of the rear wheel assembly are located in the rear concave portion and the restraining member of the rear wheel assembly is aligned with the track end portion, the rear wheel assembly is allowed to change from the folded position to the open position.

6. The cart according to claim 5, wherein when the rear wheel assembly is operated in the open position, the restraining member is located in the track end portion, preventing the rear carrier from moving toward the front side.

7. The cart according to claim 4, wherein the front panel comprises two substantially parallel front concave portions, each front concave portion in communication with a rear concave portion, each front concave portion dimensioned to receive the second portion of the arcuate arms of a rear wheel assembly when the rear carrier is located in the front panel.

8. The cart according to claim 7, wherein the front panel further comprises two substantially parallel front restraining tracks, each front restraining track arranged in relationship to a front concave portion, and wherein when the second portion of the arcuate arms of the rear wheel assembly are located in the front concave portion, the restraining member of the rear wheel assembly is adjacent to but spaced from the front restraining track.

9. The cart according to claim 8, when rear carrier is located in the front panel, the restraining member of the rear wheel assembly and the front restraining track are arranged to prevent the rear wheel assembly from operating in the open position.

10. The cart according to claim 1, wherein the first portion of the arcuate arms is separated by each other by a separation distance smaller than the end distance of the arm-end parts, and wherein each front wheel assembly further comprises a plate having a plate opening made thereon, the plate opening dimensioned to receive at least a part of the arcuate arms, the plate pivotably mounted on the wheel fork for movement between a first plate position near the first portion of the arcuate arms and a second plate position near the second portion of the arcuate arms for causing the arm-end parts to move through the front arm-receiving opening; and each rear wheel assembly further comprises a plate having a plate opening made thereon, the plate opening dimensioned_to receive at least a part of the arcuate arms, the plate pivotably mounted on the wheel fork for movement between a first plate position near the first portion of the arcuate arms and a second plate position near the second portion of the arcuate arms for causing the arm-end parts to move through the rear arm-receiving opening.

11. The cart according to claim 5, wherein when the cart is deployed in the open configuration, the rear panel and the front panel are substantially on a same plane to allow the rear rail section of each slide rail to extend to the rear panel, wherein the rear panel comprises two rail latches, each rail latch associated with a slide rail, and wherein when the rear rail section of the slide rail has extended to the rear panel to cause the restraining member of the rear wheel assembly to align with the track end portion, the rear rail section is arranged to latch onto the rail latch.

12. The cart according to claim 11, wherein the rear panel comprises a panel rim at the rear side, and wherein the two rail latches are made on the panel rim.

13. The cart according to claim 4, wherein when each of the front wheel assemblies is operated in the folded position, and the rear carrier is located in the front panel with each of the rear wheel assemblies operated in the folded position, the rear panel can be caused to move away from said same plane toward the front panel to deploy the cart in the folded configuration with the front panel facing the rear panel and each of the front wheel assemblies and each of the rear wheel assemblies located between the front panel and the rear panel.

14. The cart according to claim 13, wherein the handle comprises a first section, a second section, and a telescopic tube section for movably connecting between the first section and the second section to adjust a length of the handle, the first section pivotably mounted on the front carrier, and when the cart is deployed in the folded configuration, the length of the handle can be adjusted so that the second section is located between the front panel and the rear panel.

15. The cart according to claim 11, wherein when each of the front wheel assemblies is operated in the open position, and each of the rear wheel assemblies is operated in the open position, the front wheel assemblies and the rear wheel assemblies are arranged to support the cart in the open configuration.

16. The cart according to claim 1, wherein
each of the front wheel assemblies comprises a push plate pivotably mounted on the wheel fork, the push plate having a plate opening to receive the arcuate arms of the front wheel assembly, the push plate operable between a first position and in a second position, wherein when the push plate is in the first position, the plate opening is near the first portion of the arcuate arms, allowing the arm-end parts of the arcuate arms to rest on the front carrier on opposing sides of the front arm-receiving opening, and when the push plate is in the second position, the plate opening is arranged to cause the arm-end parts of the arcuate arms to move through the front arm-receiving opening; and
each of the rear wheel assemblies comprises a push plate pivotably mounted on the wheel fork, the push plate having a plate opening to receive the arcuate arms of the rear wheel assembly, the push plate operable between a first position and in a second position, wherein when the push plate is in the first position, the plate opening is near the first portion of the arcuate arms, allowing the arm-end parts of the arcuate arms to rest on the rear carrier on opposing sides of the rear arm-receiving opening, and when the push plate is in the second position, the plate opening is arranged to cause the arm-end parts of the arcuate arms to move through the rear arm-receiving opening.

\* \* \* \* \*